United States Patent [19]

Best et al.

[11] Patent Number: 5,909,333

[45] Date of Patent: *Jun. 1, 1999

[54] SERVO-WRITING SYSTEM FOR USE IN A DATA RECORDING DISK DRIVE

[75] Inventors: John Stewart Best; Wen-Wei Chiang, both of San Jose; Steven Robert Hetzler, Sunnyvale; Donald Edward Horne, San Jose, all of Calif.; Chih-Kung Lee, Taipei, Taiwan; Vincent Marrello, Morgan Hill, Calif.

[73] Assignee: International Business Machines Corporation, Armonk, N.Y.

[ * ] Notice: This patent is subject to a terminal disclaimer.

[21] Appl. No.: 08/878,711

[22] Filed: Jun. 18, 1997

Related U.S. Application Data

[63] Continuation of application No. 08/250,197, May 27, 1994, abandoned.

[51] Int. Cl.⁶ .................................................. G11B 5/09
[52] U.S. Cl. ........................ 360/51; 250/237 G; 360/75; 360/77.03
[58] Field of Search ................................... 360/51, 73.01, 360/73.03, 77.03, 78.11, 71, 77.02, 75; 359/566, 569; 250/237 G, 201.5, 231.13, 231.14, 231.16; 369/109, 110, 112, 103, 119, 124, 44.12, 44.27, 44.28, 44.32, 44.31

[56] References Cited

U.S. PATENT DOCUMENTS

| | | | |
|---|---|---|---|
| 3,597,750 | 8/1971 | Brunner et al. | 340/174.1 C |
| 4,516,177 | 5/1985 | Moon et al. | 360/77 |
| 4,590,527 | 5/1986 | Warner | 360/78 |

(List continued on next page.)

FOREIGN PATENT DOCUMENTS

| | | | |
|---|---|---|---|
| 0364984 | 10/1989 | European Pat. Off. | G01B 9/02 |
| 3321353 | 1/1984 | Germany . | |
| 61-66926 | 4/1986 | Japan | G01D 5/38 |
| 61-66927 | 4/1986 | Japan | G01D 5/38 |

(List continued on next page.)

OTHER PUBLICATIONS

"Laser Rotary Encoder" Research and Development Robot No. 54 pp. 77–83.

"Study of Laser Encoder By Using A Point Source Diffraction" vol. 25, No. 11 pp. 6–13.

"V International Congress On Experimental Mechanics" Society For Experimental Stress Analysis Jun. 10–15 pp. 481–486.

"Two–Dimensional Laser Interferometric Encoder For The Soft X–Ray Scanning Microscope At The NSLS" Nuclear Instruments And Methods In Physics Research A266 (1988) pp. 313–317.

"Official Journal Of The Electronic Motion Control Association" vol. 2, No. 4 Jul./Aug. 1986 pp. 1–4.

(List continued on next page.)

*Primary Examiner*—Aristotelis M. Psitos
*Assistant Examiner*—Patrick Wamsley
*Attorney, Agent, or Firm*—Ingrid M. Foerster; Monica D. Lee; David W. Victor

[57] ABSTRACT

A non-invasive servo-write system for use in a data recording disk drive. The system measures actuator position and generates a reference clock using semiconductor lasers. Internal position references are provided by reflective diffraction gratings affixed to the actuator arm and the spindle hub. Wavefront reconstruction optics correct for aberrations in the gratings. Optical sensors detect differential changes in the diffraction patterns created by the gratings, eliminating sensitivity to frequency drift. Decode electronics convert optical sensor data into an actuator position measurement. Control electronics drive the voice coil motor within the disk drive, which positions the write transducer to record servo information provided in a servo pattern generator. Transparent windows in the head-disk-assembly cover allow the servo-writer to write drives which are completely assembled and sealed.

68 Claims, 14 Drawing Sheets

U.S. PATENT DOCUMENTS

| | | | |
|---|---|---|---|
| 4,613,916 | 9/1986 | Johnson | 360/78 |
| 4,829,342 | 5/1989 | Nishimura | 356/356 |
| 4,868,385 | 9/1989 | Nishimura | 250/231 |
| 4,870,635 | 9/1989 | Block et al. | 369/215 |
| 4,920,434 | 4/1990 | Brown et al. | 360/77.08 |
| 4,931,792 | 6/1990 | Baginski | 360/72.2 |
| 5,038,233 | 8/1991 | Inoue | 360/75 |
| 5,179,485 | 1/1993 | Tamayama | 360/78.11 |
| 5,196,970 | 3/1993 | Seko et al. | 360/77.03 |
| 5,227,625 | 7/1993 | Hetzler | 360/78.11 |
| 5,227,930 | 7/1993 | Thanos et al. | 360/77.03 |
| 5,268,801 | 12/1993 | Hazel et al. | 360/77.03 |
| 5,315,372 | 5/1994 | Tsai | 360/78.11 |
| 5,325,349 | 6/1994 | Taniguchi | 360/77.03 |
| 5,339,204 | 8/1994 | James et al. | 360/51 |
| 5,442,172 | 8/1995 | Chiang et al. | 250/237 |

FOREIGN PATENT DOCUMENTS

| | | | |
|---|---|---|---|
| 61-212728 | 9/1986 | Japan | G01D 5/38 |
| 62-12814 | 1/1987 | Japan | G01D 5/38 |
| 62-6119 | 1/1987 | Japan | G01D 5/38 |
| 62-163919 | 7/1987 | Japan | G01D 5/38 |
| 62-163920 | 7/1987 | Japan | G01D 5/38 |
| 62-163921 | 7/1987 | Japan | G01D 5/38 |
| 62-200222 | 9/1987 | Japan | G01D 5/38 |
| 62-200224 | 9/1987 | Japan | G01D 5/38 |
| 62-200226 | 9/1987 | Japan | G01D 5/38 |
| 62-201313 | 9/1987 | Japan | G01D 5/38 |
| 4351766 | 12/1992 | Japan . | |
| 4351767 | 12/1992 | Japan . | |
| 2185314 | 1/1987 | United Kingdom | G01D 5/38 |
| 2187282 | 3/1987 | United Kingdom | G01D 5/38 |
| WO9004846 | 5/1990 | WIPO . | |
| WO9120077 | 12/1991 | WIPO . | |

OTHER PUBLICATIONS

Optical Journal Of The Electronic Motion Control Association Sep./Oct. 1986 pp. 14–18.

"High–Precision, Compact Rotary Encoder Uses Semiconductor Laser" JEE, Feb. 1986 pp. 50–51.

"Use Of A Crossed Holographic Grating As A Reference For An X–Y Metrology" Session IX pp. 228–231.

"Two–Point Laser Illumination Imprives Encoder Accuracy" Design Engineering Nov. 1986 p. 12.

"Laser Rotary Encoders Offer Small Size And Improved Shaft Loading" Intelligent Motion Nov. 1988 pp. 60–62.

"Laser Encoder Provides Super Resolution For High–Precision Applications" Intelligent Motion Feb. 1990 pp. 26–53.

IBM TDB vol. 23, No. 3, Aug. 1980 pp. 1234–1235 "Writing Servo Patterns In Disk Files" A. H. Bennett et al.

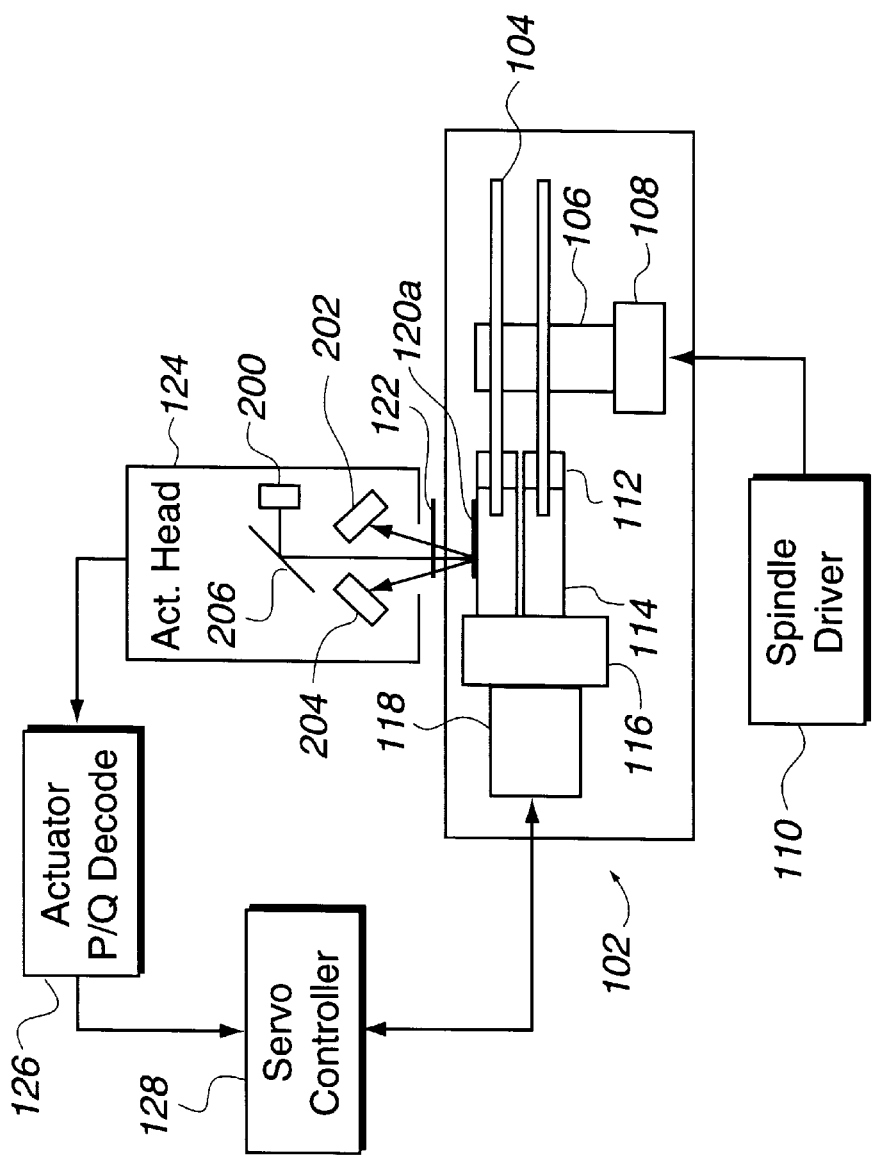

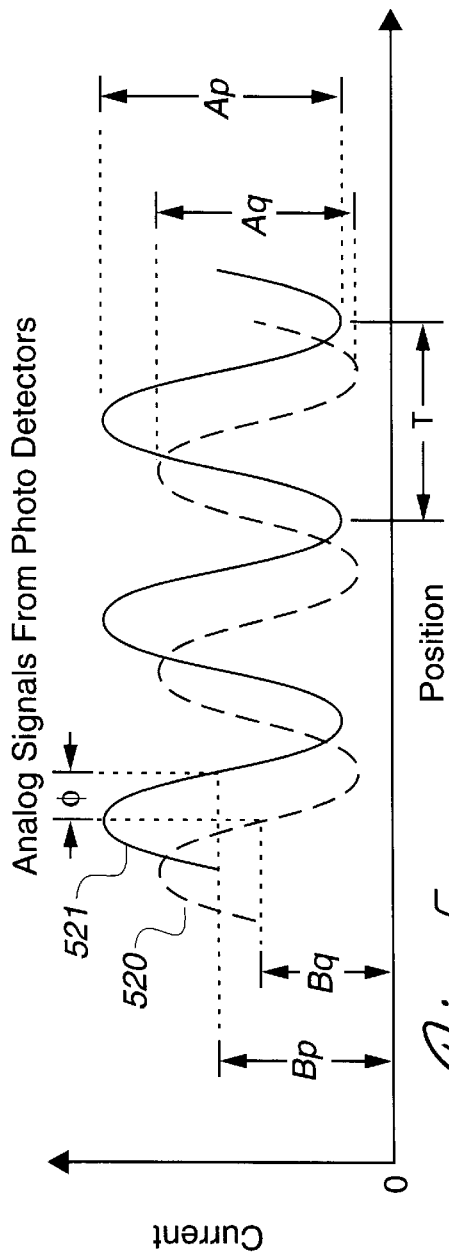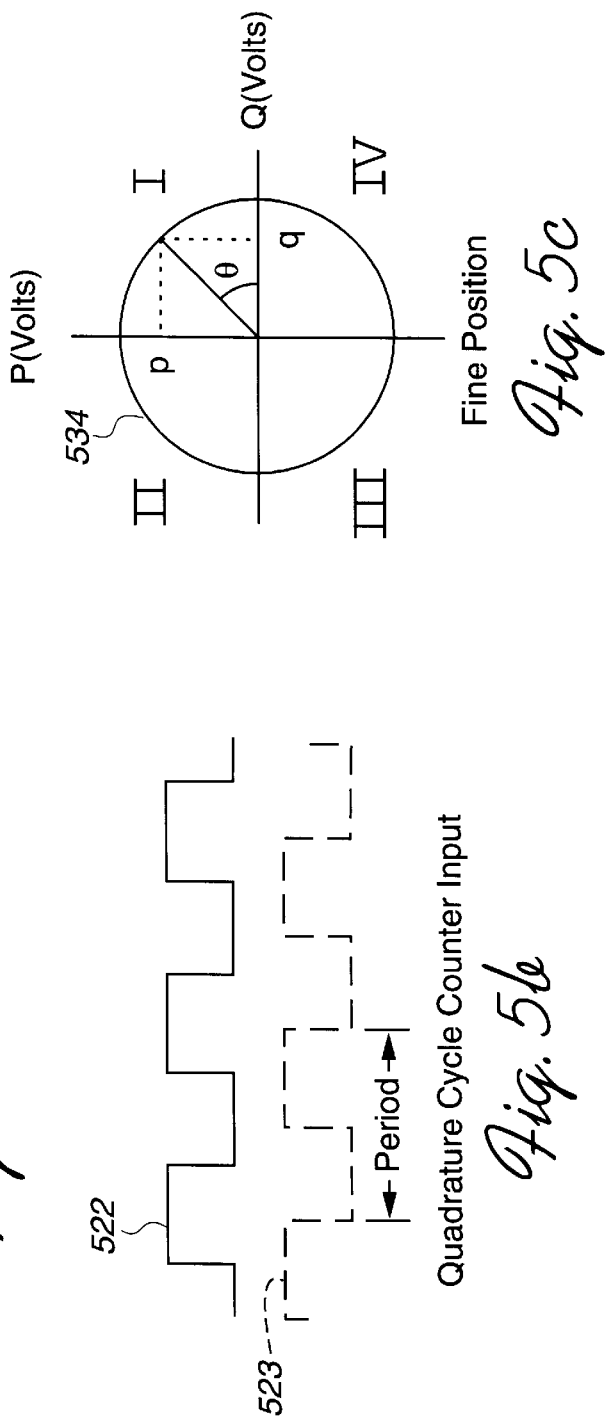

Wavefront reconstruction optics for use with radial diffraction grating

Side view of reconstruction optics

Beam Compressor

SERVO-WRITING SYSTEM FOR USE IN A DATA RECORDING DISK DRIVE

This is a continuation of Ser. No. 08/250,197, filed May 27, 1984, now abandoned.

FIELD OF THE INVENTION

This invention relates in general to data recording disk drives, and in particular to recording track positioning information on data storage disks.

BACKGROUND OF THE INVENTION

Data recording disk drives are useful in the storage of large amounts of data for computer systems. The data is stored as a series of magnetic field transitions on a magnetic recording surface. The transitions are placed on the surface by a magnetic transducer commonly referred to as a magnetic recording head. The transducer converts electrical energy into a magnetic field, the polarity of which is switched according to the information to be recorded. The magnetic field causes magnetization to remain in the media after the field is removed. The data is stored as binary information in the polarity reversals, or transitions, remaining in the media. The transducer used with magnetic media may also act as a detector to detect data stored as magnetic transitions. The transducer senses a magnetic field emanating from the magnetized media. The sensed magnetic field is converted into an electric signal which varies depending on the polarity of the magnetic field. Data is then decoded from the electrical signal. When the transducer places data on the recording media, the transducer is said to have written data to the media. When the transducer detects previously written data on the media, the transducer is said to have read data from the media. In general, systems for storing and retrieving data to/from magnetic media may employ a single transducer to both read and write data, or they may employ dual transducers, one to read and one to write.

The recording media is in the form of a disk, typically with data being recorded on both surfaces. Multiple disks may be provided to increase the aggregate storage capacity of the disk drive. The center hole in the media is typically called a hub. The hub is the means by which the recording media attaches to a motor, through a spindle shaft, which rotates the recording media. The head is flown over the surface of the recording media by virtue of the air movement created when the disk rotates. The flying height must be large enough to minimize the probability of head and disk contacts that could be detrimental to data integrity, but small enough so that the magnetic field generated by the write transducer establishes magnetic transitions in the recording media surface and so that a magnetic field in the media can be sensed by the transducer.

The head is placed in proximity to the recording surface and positioned over the desired data track by an actuator arm, to which it is attached via a suspension. The actuator arm moves the head radially with respect to the media surface from a position near the hub (the inside diameter (ID)) to a position near the rim (the outside diameter (OD)). Data is commonly written onto the media surface between the ID and OD in the form of sequential concentric tracks. The track width is usually slightly larger than the width of the write transducer. The concentric tracks may be subdivided into one or more sectors.

The head must be accurately positioned over the desired data track to read or write data. Head positioning is typically accomplished by way of an actuator positioning servo controller driving a voice coil motor (VCM) attached to the actuator arm. The actuator positioning servo controller makes use of pre-recorded head positioning information as well as track and sector identification information to move the head from one track to another, known as seeking to a desired track, and to position the head over the center of the desired track and at the appropriate sector along the track. The positioning and identification information is pre-recorded on one or more of the disk surfaces, and consists of magnetic patterns which vary in both the radial and circumferential direction to provide the actuator positioning servo controller with feedback indicating the current position of the head relative to the desired track and sector.

Depending on the track positioning architecture of the disk drive, the track positioning information may be pre-recorded on a single surface of a multiple surface disk drive, usually referred to as dedicated surface servo, or in multiple radial wedges on each of the disk surfaces, usually referred to as embedded sector servo. A disk drive using dedicated surface servo positions the actuator using the information pre-recorded on the servo surface; the position of the data heads is mechanically slaved by the actuator to the servo head position. A disk drive using embedded sector servo positions the actuator using the information pre-recorded on the particular data surface being read by the data head. In some disk drives a combination of the two architectures is used. The embedded sector servo architecture is preferred for disk drives having higher track pitch since it is less sensitive to mechanical and thermal disturbances that affect the positioning accuracy of the data head.

The data head must be accurately positioned over the desired data track and data sector before user data can be stored or retrieved from a disk drive. The actuator positioning system accomplishes this by reading the pre-written positioning and identification information and using it to update the position of the actuator. The positioning and identification information in encoded onto the disk surface in the form of a pattern of accurately sized and spaced magnetic transitions, known as servo patterns, precisely recorded in both the radial and circumferential directions. To enable the required head positioning accuracy for data read and write operations, these servo patterns must be written with an accuracy in the radial direction such that the decoded radial position can be determined to within a small fraction of the data track width.

They also must be written with an accuracy in the circumferential direction such that the track to track relative circumferential positioning of the servo pattern is kept suitably small; in the most demanding servo encoding methods, this may require that the track to track relative circumferential positioning of the individual magnetic transitions is kept to a small fraction of the recorded transition spacing in the circumferential direction.

These precisely positioned servo patterns may be recorded onto the disk surfaces prior to assembling the disks into the disk drive or after the disks are assembled into the disk drive using a process referred to as servo-writing. In either case, the required radial positioning accuracy during servo-write is typically obtained using an external, laser interferometer-controlled rotary or linear actuator mechanically coupled to the drive. The required circumferential positioning accuracy and repeatability track-to-track is obtained using a clock head positioned over the disk surface. The clock head reads approximately equally spaced transitions pre-written on a track on the disk surface. The timing jitter in the clock head readback signal is typically reduced by processing the signal using a narrow bandwidth phase lock loop.

Once the proper clock track information has been established, the servo-write process consists of positioning the external actuator arm at successive radial locations and writing the appropriate magnetic transitions at multiple positions in the circumferential direction. The process is extremely sensitive to vibration, so a large, expensive granite table must be used to steady the drive. The process is also extremely sensitive to ambient temperature variations due to the large size of the electromechanical system used to position the actuator. To minimize this disturbance the process is usually performed in a temperature controlled room. To provide for the mechanical coupling to the actuator and to insert the additional clock head into the drive, the drive must remain open (or provide for the required openings) and unsealed during the process, necessitating the use of a clean room environment. Also, the final assembly procedure which occurs after the servowriting process may introduce stress to the drive's base plate when the cover plate is attached, causing tilting of the spindle shaft and actuator pivot axis and generating misalignment between the servo patterns on different disks. Thus, for all the above reasons, the servo-write process is both costly and error prone.

Recent developments in servo-writing have addressed some of the above-described problems. A semiconductor laser rotary encoder is used to generate position reference information. The rotary encoder connects to the actuator arm via an exposed pivot outside the disk drive. A mechanical coupling is used between the rotary encoder and the pivot to insure the integrity of the connection. A reference clock is generated using a patterned disk pasted onto an exposed portion of the spindle shaft which extends outside the disk drive. The patterned disk has light and dark sectors that reflect incident light with different intensity. The detected intensity pattern is used to generate the clock signal.

While the rotary encoder servo-write system eliminates the need for a clean room and a granite table, it incurs several drawbacks of its own. First, the mechanical coupling required between the semiconductor laser rotary encoder and the actuator arm adds to the cost of the disk drive and the complexity of the servo-write process, and limits the accuracy achievable. Second, to expose the spindle shaft for generating the reference clock, a double sealed bearing is required, again increasing the cost of the disk drive. Third, the reference clock generated by the patterned disk is not accurate enough for use in a high density disk drive.

Thus, there has heretofore existed an unmet need in the art for a servo-writing system that is non-invasive, requires no mechanical coupling to the actuator or the rotating disk spindle, and provides sufficient performance for use in modern, high density data recording disk drives. The present invention is directed to meeting this need.

SUMMARY OF THE INVENTION

In accordance with the invention, a servo writer system is provided which uses semiconductor lasers positioned external to a disk drive and reflective diffraction gratings affixed inside the disk drive to provide precision positioning signals. One laser emits a beam directed through a light-transmissive window toward a grating affixed to the actuator arm, while a second emits a beam directed through a light-transmissive window toward a grating affixed to the spindle shaft. Diffraction patterns reflected back from the gratings are directed into detection optics which convert the patterns into electrical signals. The signal from the actuator optics is received by actuator position decode electronics which transform it into an actuator positioning signal. The signal from the spindle shaft optics—the clocking signal—is received by write clock detection electronics which transform it into a reference clock signal. The positioning and reference clock signals are used to determine the positioning of the actuator arm and disk stack. Electronics then receive the signals and use them to coordinate the positioning of the actuator arm with the recording of servo information on the disk surfaces.

The servo writing system of the invention includes two principal subsystems: an actuator positioning subsystem and a write clock subsystem. The actuator positioning subsystem itself includes a semiconductor laser and a diffraction grating affixed to the actuator arm, together with reconstruction optics which compensate for changes in the optical path, and detection optics which measure phase differences in the diffraction pattern reflected from the grating. The actuator positioning subsystem also includes the actuator position signal decoding electronics which receive the measured phase differences and convert them into a signal representing the actuator arm position. In the preferred embodiment, the actuator position signal decoding electronics includes coarse decode electronics which provide a coarse actuator position signal, and fine decode electronics which produce a fine actuator position signal. The coarse actuator position signal and the fine actuator position signal are then spliced together to determine the position of the actuator arm.

The write clock subsystem includes a second semiconductor laser and a diffraction grating affixed to the spindle shaft, together with reconstruction optics which compensate for changes in the optical path, and detection optics which measure phase differences in the diffraction pattern reflected from the grating. The write clock subsystem also includes the write clock detection electronics which receive the measured phase differences and convert them into a reference clock signal. In the preferred embodiment, the write clock detection electronics includes raw clock detection electronics as well as timing adjustment electronics which compensate for grating centration error with respect to the spindle shaft center of rotation. In an alternative embodiment the write clock subsystem may be configured with dual semiconductor lasers/detection optics positioned on opposite sides of the diffraction grating center from one another. Mixer electronics are used to combine the two reference clock signals to produce a reference clock signal compensated for grating centration error.

Through the use of semiconductor lasers positioned externally to the disk drive, along with optics and electronics which detect and compute precise positioning information, the present invention provides a servo writer system that is non-invasive, requires no mechanical coupling to the actuator or the rotating disk spindle, and provides positioning accuracy required for use in high density disk drives. The only parts of the system positioned inside the disk drive housing, the radial diffraction gratings, are lightweight and inexpensive; they may be affixed during the manufacturing process prior to sealing the disk drive, and then left in the drive after completion of servo writing.

BRIEF DESCRIPTION OF THE DRAWING

FIG. 2a illustrates in block diagram form the actuator positioning sub-system of the present invention.

FIG. 2b illustrates a linear diffraction grating for use with the actuator positioning sub-system.

FIG. 2c illustrates a radial diffraction grating for use with the actuator positioning sub-system.

FIG. 5a illustrates in graphical form the output analog signals from the photo detectors of the actuator position sensor.

FIG. 5b illustrates in graphical form the quadrature cycle counter input.

FIG. 5c illustrates in graphical form the fine positioning information used by the actuator position sensor.

DETAILED DESCRIPTION OF THE INVENTION

I. Servo-writing System

Figure 1B:
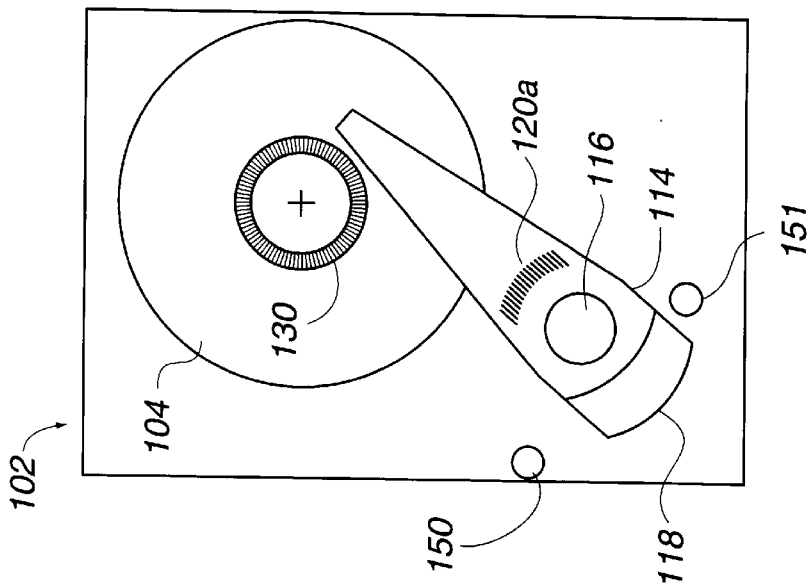
FIG. 1b illustrates in pictorial form the placement of gratings in a data recording disk drive in accordance with the present invention.
Figure 1A:
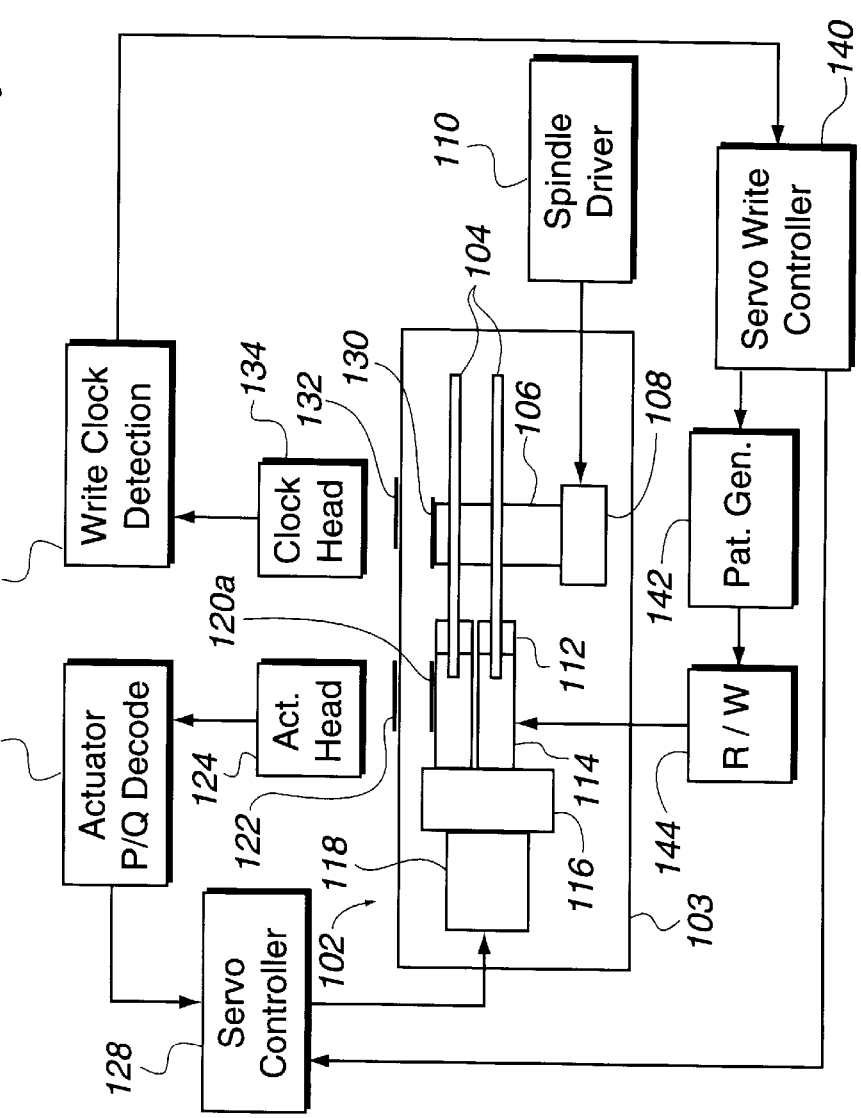
FIG. 1a illustrates in block diagram form the functional components of the servo-writing system of the present invention.

Shown in FIG. 1a is a block diagram illustrating a servo writing system according to the present invention in use with a data recording disk drive. Data recording disk drive 102 includes housing enclosure 103, along with a spindle stack which itself includes one or more disks 104, spindle shaft 106, and spindle motor 108. Disk drive 102 also includes spindle speed controller 110, read/write amplifier 144, optically transparent windows 122 and 132 disposed in housing 103 and located over diffraction gratings 120a and 130, respectively, and an actuator which itself includes one or more magnetic recording heads 112, rotary actuator arm 114 (which further includes any required suspension assembly), actuator arm pivot 116 (sometimes also referred to as an "E Block" or "E Plate"), and voice coil motor 118.

Housing 103 generally surrounds the delicate disk drive components and protects them from contamination and other damage. It typically includes a base portion and a cover portion, (not shown) although many equivalent configurations are found in the art. Frequently spindle motor 108 is actually mounted partially through the base, and thus is integral with protective housing 103. It is to be noted that all of these minor variations are considered to be encompassed by the exemplary embodiment shown in FIG. 1a and described above, as well as by the present invention.

Shown in FIG. 1b is a top view of the inside of disk drive 102 depicting the layout and positioning of various components, including the diffraction gratings used in the servo writing process. Included are one or more disks 104 of the above-described spindle stack, rotary actuator arm 114, actuator arm pivot 116, and voice coil motor 118 of the above-described actuator, actuator crash stops 150 and 151, actuator diffraction grating 120a and write clock diffraction grating 130. It is to be noted that while the gratings are affixed to the actuator and spindle stack, neither the actuator positioning subsystem nor the write clock subsystem requires any further mechanical attachment to the actuator or the spindle stack. Only optical and electrical coupling is used to communicate between the actuator positioning sub-system and the actuator, and between the write clock sub-system and the spindle stack. This is in contrast to the prior art, where optical encoders are mechanically attached to the spindle stack and the actuator. It is also to be noted that while the actuator grating is shown affixed to the actuator, it may alternatively be affixed to any appendage of the actuator such as a small flange or other outcropping. Moreover, either or both of the gratings may be affixed temporarily for purposes of servo writing, then later removed. In some instances, this may enable selection of the gratings from a wider array of choices than would otherwise be possible (due to size, weight, and cost constraints) if they were to be left in the drive permanently.

Referring back to FIG. 1a, the servo-writing system includes an actuator positioning sub-system, a write clock sub-system, servo-write controller 140 and write pattern generator 142 which cooperate to write accurately positioned (both radially and circumferentially) magnetic transitions in specific patterns onto one or more of the disk surfaces in order to precisely encode the servo positioning information. The actuator positioning sub-system includes optical actuator position sensor 124, diffraction grating 120a, optical window 122, actuator position sensor signal decoding system 126, actuator position controller 128, actuator VCM 118, and actuator arm 114, which precisely position one or more magnetic recording heads 112 radially over their corresponding disk surfaces 104 to be servo-written. The write clock sub-system includes optical clock sensor 134, diffraction grating 130, optical window 132 and write clock signal processing electronics 136, which generate a precise write clock timing signal and disk index timing signal that is "phase-locked" to the disk surface(s).

Robust mechanical fixturing (not shown) is used to fix the positions of disk drive 102, optical actuator position sensor 124, and optical clock sensor 134 relative to each other. The mechanical fixturing is also isolated from external mechanical and thermal disturbances that could degrade the accuracy of the recorded magnetic patterns. This fixturing may be constructed using any of a variety of known components in accordance with known engineering principles, and thus will not be described in greater detail here. It is to be noted, though, that a granite table, such as is required in the prior art, is not necessary to ensure accurate recording.

In operation, servo-write controller 140 directs actuator position controller 128 to position actuator 114 and attached recording head(s) 112 at the desired radial position on the disk surface(s) where the magnetic patterns are to be written. Servo-write controller 140 also directs write pattern generator 142, read/write amplifier 144 and one or more magnetic heads to write the desired magnetic transition pattern onto one or more disk surfaces. The precise radial positions of the recorded magnetic transitions are controlled by the actuator positioning subsystem which produces the required actuator radial position signals used to precisely position the recording head. The precise circumferential positions of the recorded magnetic transitions are controlled by the write clock sub-system which produces the required clock and disk index signals used to precisely clock the data pattern stored in pattern generator 142.

Servo-write controller 140 in concert with the write clock sub-system and read/write amplifier 144 also selects in sequence the magnetic recording head and thus the disk surface to be servo-written. One or more disk surfaces may be servo-written during any given disk revolution. The process is repeated at a multitude of sequential radial positions until the desired ensemble of magnetic transitions is written on one or more of the disk surfaces. In this manner the precise radial and circumferential magnetic patterns are recorded as required to encode the servo positioning information.

It should be noted that by proper selection of the shape of actuator grating 120a, the present invention is equally applicable to disk drives using rotary actuators, linear actuators, or actuators that produce a combination of linear and radial motion such as a leaf spring actuator made using a parallelogram construction.

The servo position information mentioned above may be encoded using any of a variety of methods well known in the art. For example, the track number may be encoded using a grey code and the fine position servo information may be encoded using quadrature burst patterns. The entire servo-writing process may be accomplished on a fully assembled, sealed disk drive in a non-clean room environment since only optical and electrical access to disk drive 102 is required. No mechanical coupling or physical access is required to the spindle motor or the actuator arm. Also, the compactness of the optical actuator position sensor, optical write clock sensor and modern disk drive make the servo-write process less sensitive to mechanical and thermal disturbances and easier to isolate from such disturbances relative to conventional servo-writing methods.

II. Actuator Positioning Sub-System

Shown in FIG. 2a is the actuator positioning sub-system of the present invention, including optical actuator position sensor 124 which is comprised of semiconductor laser source 200, laser beam deflector 206 and detection optics 202 and 204, as well as diffraction grating 120a, optical window 122, actuator position sensor signal decoding system 126, actuator position controller 128, actuator VCM 118, and actuator arm 114. As will be described in further detail below, the sub-system may be used with either a linear grating or a radial grating at 120a by modifying the design of optical actuator position sensor 124.

A. Optical Position Sensor

Optical actuator position sensor 124 uses a semiconductor laser light source 200. In general, semiconductor lasers exhibit wavelength drift with time and temperature, which limit their usefulness in classical distance-sensing interferometers. However, the actuator position sensor of the present invention is insensitive to wavelength drift since the measurement of the diffraction grating position is determined by the grating line pitch and the relative phase change between the +1 and −1 diffraction laser beams. In further contrast to conventional laser interferometer position measurement systems which use a dual frequency source beam to resolve the direction of motion, the present invention uses only a single frequency laser beam to determine the direction of motion.

Planar, reflective diffraction grating 120a can be either a linear or a radial design depending on the design of actuator position sensor 124. The linear diffraction grating, shown schematically in FIG. 2b, has parallel grating lines with a constant pitch and depth. Diffraction grating 120a is generally in the shape of an arc segment wide enough to accommodate the diameter of the impinging laser beams from actuator position sensor 124 and long enough to accommodate the actuator swing angle. The grating pivots around point 230 which is coincident with the center of rotation of the actuator pivot. In FIG. 2a, the grating is shown affixed to actuator arm 114 on the magnetic head side of actuator pivot 116 but may be located on the voice coil side or anywhere else on the actuator with equal effect.

The radial diffraction grating, shown schematically in FIG. 2c, has radial grating lines that converge at a point 230 which is coincident with the center of rotation of the actuator pivot 116. The linear grating has a pitch approximately twice the wavelength of the laser beam and a depth approximately ¼ the wavelength of the laser beam. Likewise, the radial grating at the radial position where the laser beam impinges on its surface has a pitch approximately twice the wavelength of the laser beam and a depth approximately ¼ the wavelength of the laser beam. To maximize the performance of the optical position sensor, the grating depth and duty cycle is selected to minimize the intensity of the 0th order reflection and maximize the intensity of the 1st order reflections. The grating pitch is selected to yield a 1st order diffraction angle that is large enough to permit the 1st order diffracted beam to be adequately separated from the incident laser beam and not so large to impair the ability to isolate the 1st order diffracted beam from the higher order diffracted beams.

Precise master gratings having the desired characteristics may be generated by a number of known methods including holography, photo lithography, E-beam lithography, E-beam etching, and ruling engine. Appropriately thin, low cost, precision replicate gratings having the desired size and shape may then be mass produced by a number of known methods including 2P photopolymer, epoxy duplication, injection molding, and embossing on a variety of substrate materials such as metal, glass, plastics and polymers. The replicate gratings are rendered highly reflective at the desired laser beam wavelength using known methods such as depositing an appropriate thin metal film or depositing one or more dielectric layers having the appropriate thickness and dielectric constants. To minimize the potential adverse effects on actuator performance caused by the added grating mass, it is advantageous to use a small grating and to select a low density substrate or even preferably to replicate the grating directly onto the actuator surface as shown in FIG. 1b.

Figure 3:
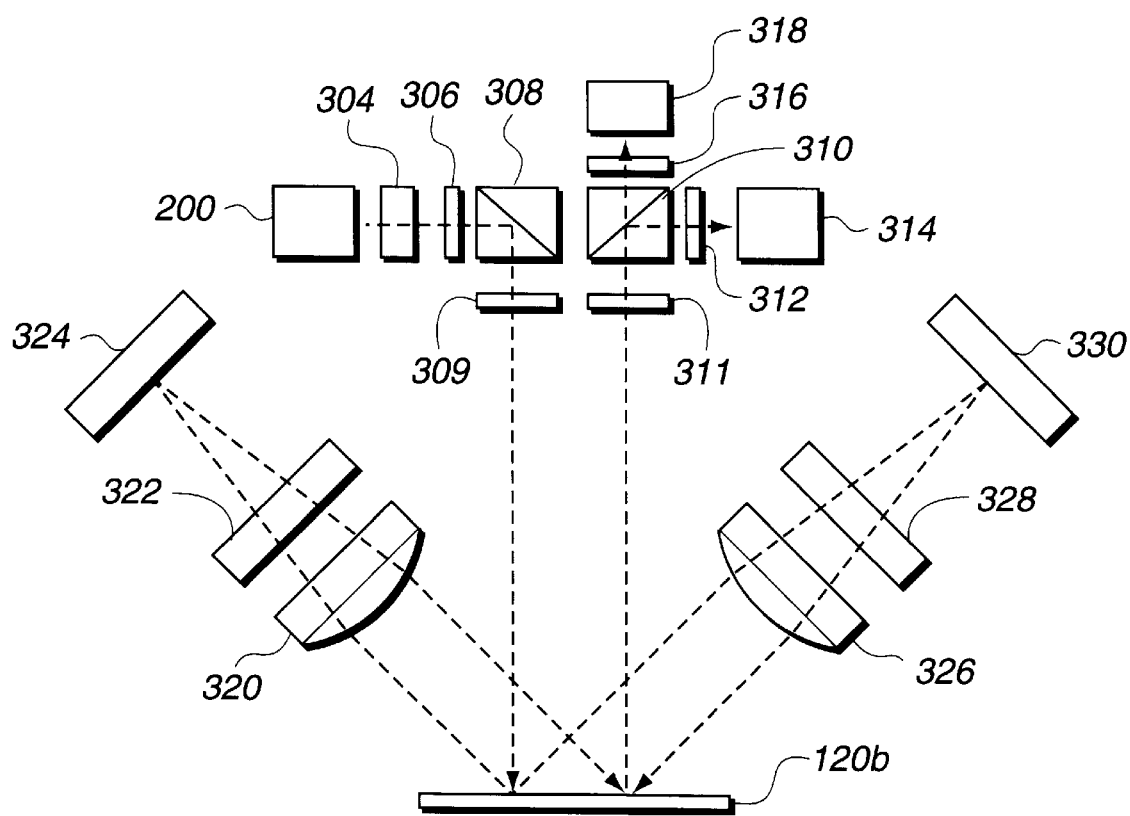
FIG. 3 illustrates a cross-sectional view of an actuator position sensor for use with a linear grating in accordance with the present invention.

Shown in FIG. 3 is a cross-sectional diagram illustrating the detailed design of actuator position sensor 124 for use with a linear diffraction grating in accordance with the present invention. The design includes semiconductor laser 200, collimator lens 304, polarizer 306, polarizing beam splitter 308 and ¼ λ plate 309 which comprise the laser beam source; spherical lenses 320 and 326, polarizers 322 and 328, mirrors 324 and 330 which comprise two 1X telescopes; and ¼ λ plate 311, non-polarizing 50% beam splitter 310, polarizers 312 and 316, and photo detectors 314 and 318 which comprise the detection optics. With regard to semiconductor laser 200, it is to be noted that a semiconductor laser is preferred due to its attractive cost and size but other laser types may also be selected.

In operation of actuator position sensor 124, semiconductor laser 200 emits a mostly linearly polarized laser light beam which is collected and collimated by collimator lens 304. Polarizer 306 transmits preferentially the p-polarized beam and polarizing beam splitter 308 directs the resultant laser beam towards linear diffraction grating 120b through ¼ λ plate 309. ¼ λ plate 309 converts the highly linearly polarized laser beam to a circularly polarized laser beam. The resultant laser beam impinges onto diffraction grating 120b at normal incidence and is diffracted. Diffraction grating 120b is designed to diffract the majority of the beam into +1 and −1 order beams. Grating 120b is located in a plane orthogonal to the input laser beam with the grating lines oriented such that the +1 and −1 order diffracted laser beams are directed onto lenses 320 and 326 respectively. The 1st order diffraction angle θ can be calculated from the equation $\sin\theta = \pm d/\lambda$ where d is the grating pitch and λ is the laser wavelength.

Spherical lens 320, polarizer 322 and mirror 324 comprise 1X telescope laser beam reconstruction optics for the +1 order diffracted beam; the 1X telescope will be described in further detail subsequently. In general, the +1 order diffracted beam is focused onto mirror 324 through polarizer 322 by spherical lens 320 and reflected back onto grating 120b as a re-collimated beam. The function of polarizer 322 is to allow only the p-polarized part of the +1 order diffracted beam to be transmitted. Likewise, spherical lens 326, polarizer 328 and mirror 330 comprise 1X telescope laser beam reconstruction optics for the −1 order diffracted beam. The −1 order diffracted beam is focused onto mirror 330 through polarizer 328 by spherical lens 326 and is reflected back onto grating 120b as a re-collimated beam. The function of polarizer 328 is to allow only the s-polarized part of the −1 order diffracted beam to be transmitted. Mirrors 324, 330, polarizers 322, 328 and lenses 320, 326 are positioned and aligned such that the returned +1 and −1 order beams overlap at grating 120b at a position displaced from the source laser beam incident on the grating, such that the two beams are collinear from the grating to the detection optics and such that resultant wavefront aberrations are minimized.

The +1 and −1 order collimated beams returned to grating 120b are diffracted normal to its surface towards ¼ λ plate 311. ¼ λ plate 31 1, non-polarizing 50% beam splitter 310, polarizers 312 and 316, and photo detectors 314 and 318 comprise the detection optics for the resultant laser beams. ¼ λ plate 311 converts the p-polarized +1 order laser beamt and s-polarized −1 order laser beam into right and left polarized laser beams respectively. The resultant laser beam is equivalent to a linearly polarized laser beam with its polarization direction determined by the relative phase difference between the +1 and −1 order diffracted laser beams.

Half of the resultant laser beam passes through non-polarizing beam splitter 310, polarizer plate 316 and impinges on photo detector 318. Photo detector 318 measures the laser beam intensity transmitted through polarizer plate 316. The other half of the resultant laser beam is reflected by non-polarizing beam splitter 310, passes through polarizer plate 312 and impinges on photo detector 314. Photo detector 314 measures the laser beam intensity transmitted through polarizer plate 312.

The motion of diffraction grating 120b in the plane orthogonal to the input laser beam results in the phase of the +1 order diffracted laser beam leading or lagging the −1 order diffracted laser beam. Whether the phase leads or lags is determined by the direction of motion. The phase difference between the +1 and −1 order diffracted laser beams is directly proportional to the displacement of the grating within a waveform cycle.

Photo detectors 314 and 318 generate electrical current signals which vary sinusoidally with displacement of diffraction grating 120b. The two polarizer plates 312 and 316 are aligned to have their polarization directions rotated by 45° when referred to the plane orthogonal to the incident laser beam. This results in an approximately 90° electrical phase shift between the two photo detector's signals, which is used to determine the direction of motion of diffraction grating 120b. The comparable amplitude, quadrature electrical current signals are decoded to determine grating position and direction of motion.

Actuator position sensor 124 may be used to detect motion of diffraction grating 120b in the plane parallel to its surface having a component orthogonal to the grating lines. When diffraction grating 120b moves in a straight line, as is the case if it is attached to a linear actuator, the laser beams impinging onto lenses 320 and 326 are stationary. However, when diffraction grating 120b moves so as to sweep out an arc, as is the case if it is attached to a rotary actuator, the laser beams impinging on lenses 320 and 326 also sweep out an arc on their respective surfaces. Therefore, the laser beams transmitted to mirrors 324 and 330 also sweep out an arc on their respective surfaces. The 1X telescopes compensate for the resultant changes in optical path of the diffracted laser beams to maintain the collinearity of the resultant laser beams directed towards the detection optics. The maximum arc angle and thus the maximum rotation angle of the actuator that can be accommodated is determined by the diameter of the components comprising the two 1X telescopes, the wavefront quality of the resultant laser beam impinging on the detection optics, and the size of the grating. In practice, the resultant laser beam wavefront quality is determined primarily by the design of lenses 320 and 326 and the wavefront quality of the source laser beam.

The laser beam stability of semiconductor lasers is known to be sensitive to having even a small fraction of the laser beam reflected back into the optical cavity. To minimize the intensity of the laser beam reflected back to the laser, in accordance with the present invention, all the optical component surfaces are anti-reflection coated. In addition, polarizer 306, polarizing beam splitter 308 and ¼ λ wave plate 309 function to further isolate the laser from 0 order laser beam reflections from the grating surface. The anti-reflection coatings also serve to optimize signal-to-noise ratio of the electrical signals generated by the photo detectors by enhancing the detected laser beam intensity and by minimizing the intensity of spurious laser beams reflected from the various optical components. In the preferred embodiment a relatively large diameter collimated laser beam (between 0.5 mm to 5 mm) is used in the design of optical actuator position sensor 124 to facilitate alignment of the optical components, to maximize the collinearity of the +1 and −1 order laser beams returned to the detection optics, to reduce the sensitivity to component misalignment, and to reduce the sensitivity to grating defects. The ability of the actuator optical head to tolerate grating defects reduces the grating cost by enabling a wider selection of suitable replication methods and by enhancing manufacturing yields.

Figure 4:
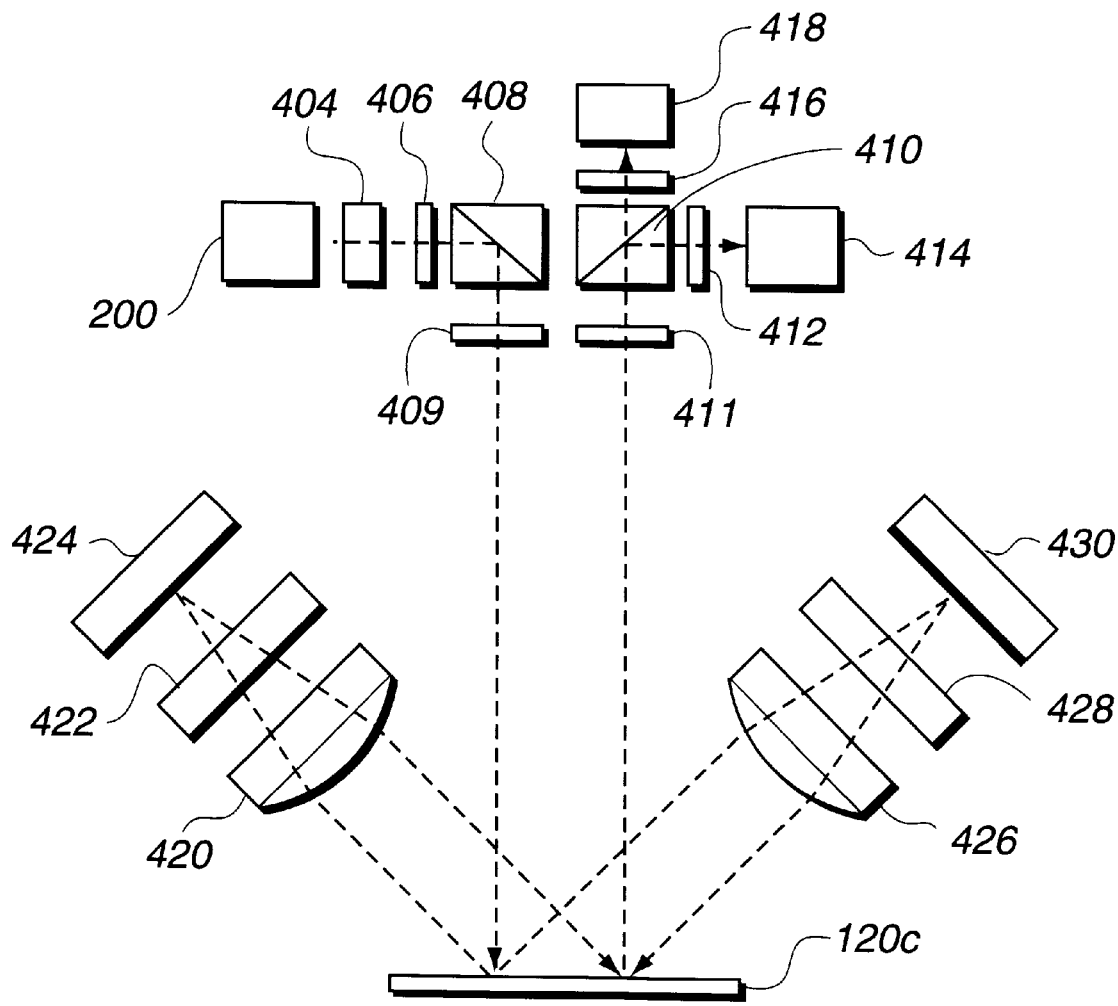
FIG. 4 illustrates a cross-sectional view of an actuator position sensor for use with a radial grating in accordance with the present invention.

Shown in FIG. 4 is a schematic diagram illustrating the design of actuator position sensor 124 for use with a radial diffraction grating (designated 120c) in accordance with the present invention. The design and operation are similar to the actuator position sensor described above with reference to a linear diffraction grating with the exception that plane mirrors 324 and 330 are replaced by roof prisms 424 and 430 and linear grating 120a is replaced by radial grating 120c. The +1 and −1 order diffracted laser beams impinging on roof prisms 424 and 430, respectively, are stationary as the radial grating sweeps an arc, provided the grating lines on the radial diffraction grating converge precisely at a point directly over the rotation center of rotary actuator pivot 116.

It is critical that the point at which the grating lines converge be collinear with the rotation axis of the actuator in order for the 1X telescopes to adequately compensate for the optical aberrations. Equivalently, the orientation of the plane determined by the two 1X telescopes must be orthogonal to the radial grating lines illuminated by the incident laser beam. If the alignment error between the pivot of the actuator and the point at which the radial grating lines converge becomes unacceptably large as the radial grating rotates, an electromechanical system may be used to maintain the optical head orthogonal to the radial grating lines, thereby still achieving the required orientation.

B. Actuator Optical Position Sensor Signal Decode Electronics

Actuator optical position sensor signal decode electronics 126 (from FIG. 1) includes signal detection electronics, decoding electronics, and a decoding algorithm. FIG. 5a illustrates a timeline of the sinusoidal signals input to the actuator optical position sensor signal decode electronics. The vertical axis of the timeline is the electrical current signal; the horizontal axis is the grating position scale. Electrical current signals 520 and 521 are produced by photo detectors 314 and 318 when using a linear grating to sense the actuator position, or by photo detectors 414 and 418 when using a radial grating to sense the actuator position. The electrical current signals traverse one complete cycle as the grating moves a distance equal to ¼ the grating pitch. The electrical current signals are fully described by amplitudes $A_q$ and $A_p$, DC offsets $B_q$ and $B_p$, and phase angle $\phi$.

Due to optical component and alignment tolerances, the corresponding parameters for the two waveforms in general are of comparable magnitude but not identical, and the phase angle $\phi$ is approximately 90°. Further, the parameters describing the signal waveform will depend somewhat on grating position due to spatial grating diffraction efficiency variations, variations in the wavefront quality and deviations from collinearity of the +1 and −1 order diffracted beams returned to the photo detectors. Most of these effects are present to some degree in a practical, cost effective design. The optical actuator position sensor and grating are designed to minimize the parameter variations due to grating position while maximizing the cost effectiveness of the design. The actuator position signal decode electronics are in turn designed to compensate for non-ideal signals produced by practical gratings and optical actuator heads.

Figure 6:
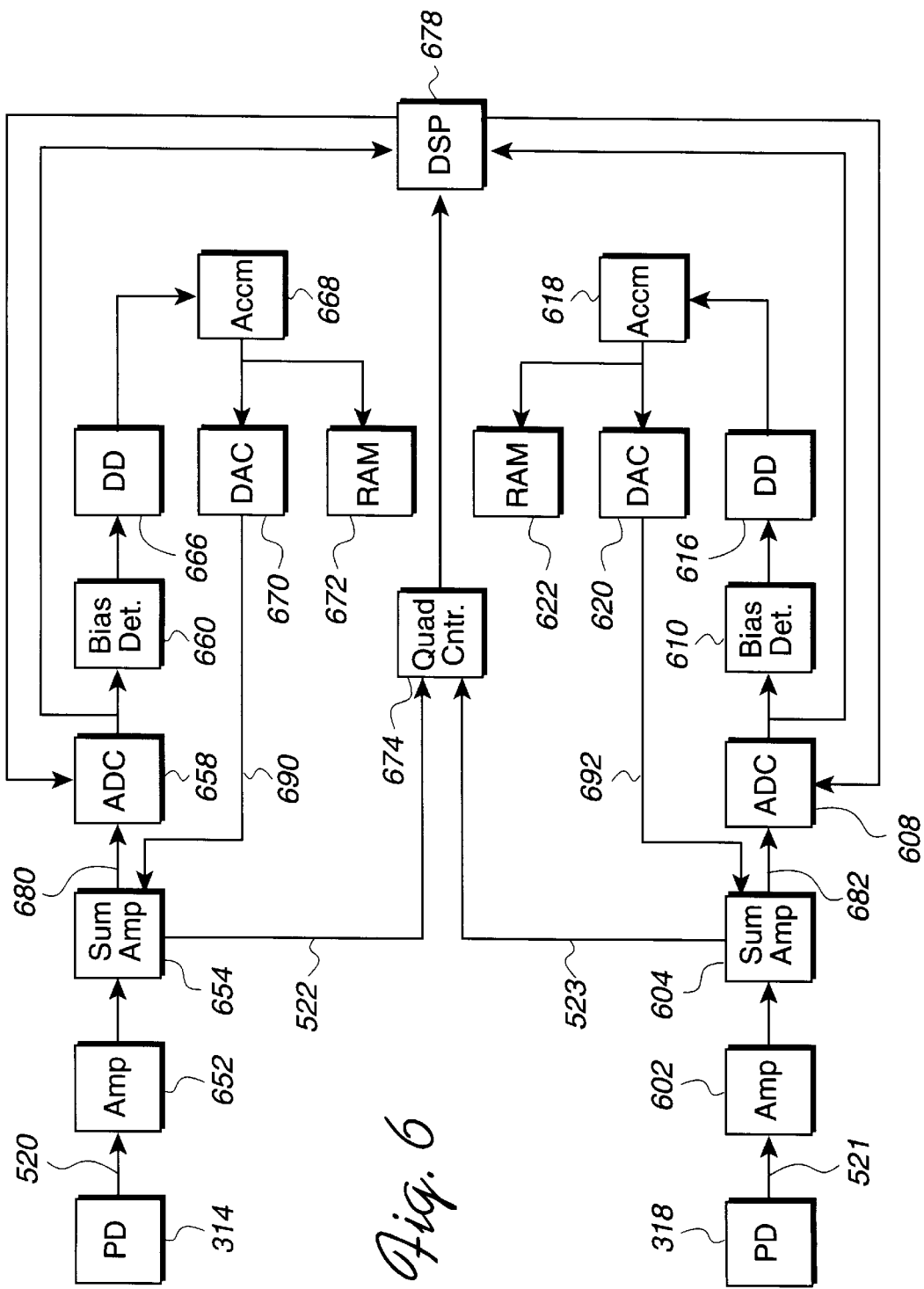
FIG. 6 illustrates in block diagram form the actuator position decode electronics for the servo-writing system of the present invention.

Shown in FIG. 6 is a block diagram illustrating the actuator optical position sensor signal decode electronics. Included are photo detectors 314 and 318, amplifiers 602 and 652, summing amplifiers 604 and 654, analog to digital convertors (ADC) 608 and 658, bias detectors 610 and 660, digital dividers 616 and 666, digital accumulators 618 and 668, random access memory (RAM) 622 and 672, digital to analog converters (DAC) 620 and 670, quadrature counter 674, and processing unit 678.

In operation, the low level electrical current signal 520, generated by photo detector 314, is amplified by amplifier 652. The resultant signal from amplifier 652 is summed with signal 690 by summing amplifier 654, and then digitized by ADC 658. DC offset bias compensation signal 690 has an amplitude which compensates for DC bias offsets $B_q$. Similarly, low level electrical current signal 521 generated by photo detector 318 is amplified by amplifier 602. The resultant signal is summed with signal 692 by summing amplifier 604 and then digitized by ADC 608. DC offset bias compensation signal 692 has an amplitude which compensates for DC bias offsets $B_p$. Amplifiers 604 and 654 incorporate low pass filters with the cutoff frequency set to attenuate high frequency noise while faithfully passing the required signal bandwidth. Signals 680 and 682 sampled by ADCs 608 and 658 are faithful representations of electrical current signals 520 and 521, respectively, with the DC bias offset removed. The resultant signals 680 and 682 are shown graphically in FIG. 5c and labeled q and p, respectively. The q signal is plotted on the horizontal axis and the p signal is plotted on the vertical axis. The p and q signals trace out ellipse 534 as diffraction grating 120a is moved by a distance equal to ¼ the grating pitch. The ellipse is traced out in a clockwise or counter-clockwise direction depending on the direction of grating motion. This lends itself to using a quadrature up/down counter to count the number of complete ellipse rotations taking into account the direction of rotation.

The coarse decode position is obtained by tracking the number and sign of complete ellipse rotations. This quantity is measured by coarse decode electronics which in the preferred embodiment include quadrature counter 674 and summing amplifiers 654 and 604 in FIG. 6. Quadrature counter 674 receives input from summing amplifiers 654 and 604 in the form of square wave signals 522 and 523, which are phase synchronous with waveforms 520 and 521, respectively. These square wave signals are shown schematically in FIG. 5b. Quadrature counter 674 uses the transition edges of square waves 522 and 523 to count the total number and sign of complete ellipse rotations. The counter value provides the coarse position of the grating with respect to an arbitrary initial position. The cutoff frequency of the low pass filters in amplifiers 654 and 604 is set to attenuate high frequency noise and pass the bandwidth required by quadrature counter 674. The cutoff frequency is determined from the required maximum grating velocity and the pitch of the diffraction grating. With respect to the above-described preferred implementation of the coarse decode electronics, it is to be noted that many alternative embodiments are available, including software-based approaches, which are considered to be encompassed by the present invention.

The fine decode position is determined by measuring the phase angle between the p and q signals. For the special case in which signals 680 and 682 have equal maximum amplitude and the phase angle $\phi$ between them is exactly 90° the curve 534 traced out by the p and q signals is a circle. In this special case, the fine decode position, x, at time t is calculated from the expression:

$$x(t) = \frac{d}{2\pi}\theta(t) \qquad (1)$$

where the instantaneous angle $\theta(t)$ is calculated using the expression:

$$\theta(t) = \tan^{-1}\left[\frac{p(t)}{q(t)}\right] = \tan^{-1}\left[\frac{\sin\theta(t)}{\cos\theta(t)}\right] \quad (2)$$

For the more general case where curve 534 traced out by the p and q signals is an ellipse, the angle θ(t) is determined using a more general decoding algorithm which properly accounts for the shape, orientation and any residual DC offsets of the ellipse. In general, the p(t) and q(t) signals can be expressed as follows:

$$\begin{bmatrix} p(t) \\ q(t) \end{bmatrix} = \begin{bmatrix} B_p + A_p \sin[\theta(t)] \\ B_q + A_q \sin[\theta(t) + \phi] \end{bmatrix} \quad (3)$$

Equation 3 is transformed to equation 4 below.

$$\begin{bmatrix} \cos\theta(t) \\ \sin\theta(t) \end{bmatrix} = \begin{bmatrix} c_p & d_p & b_p \\ c_q & 0 & b_q \end{bmatrix} \begin{bmatrix} p(t) \\ q(t) \\ 1 \end{bmatrix} \quad (4)$$

The parameters $c_p$, $c_q$, $d_p$, $b_p$, and $b_q$ in equation 4 are defined by the following:

$$\begin{bmatrix} c_p & d_p \\ c_q & 0 \end{bmatrix} = \begin{bmatrix} 0 & A_p \\ A_q \sin\phi & A_q \cos\phi \end{bmatrix} \quad (5)$$

$$\begin{bmatrix} b_p \\ b_q \end{bmatrix} = \begin{bmatrix} c_p & d_p \\ c_q & 0 \end{bmatrix} \begin{bmatrix} -B_p \\ -B_q \end{bmatrix} \quad (6)$$

At any given grating position the ellipse best fit parameters $c_p$, $c_q$, $d_p$, $b_p$, and $b_q$ are determined as follows. Multiple data points ($p_i$, $q_i$) on the ellipse are captured by dithering the grating position so as to sweep out one or more ellipses. The measured data points ($p_i$, $q_i$) are then applied iteratively to equation 4 and equation 7 below.

$$\begin{bmatrix} c_p \\ d_p \\ b_p \\ c_q \\ b_q \end{bmatrix} = \quad (7)$$

$$\left(\sum_{i=1}^{N} \begin{bmatrix} p_i \cos\theta_i \\ q_i \cos\theta_i \\ \cos\theta_i \\ p_i \sin\theta_i \\ \sin\theta_i \end{bmatrix} \begin{bmatrix} \cos\theta_i \\ \sin\theta_i \end{bmatrix}^T \begin{bmatrix} p_i & q_i & 1 & 0 & 0 \\ 0 & 0 & 0 & p_i & 1 \end{bmatrix}\right)^{-1} \left(\sum_{i=1}^{N} \begin{bmatrix} p_i \cos\theta_i \\ q_i \cos\theta_i \\ \cos\theta_i \\ p_i \sin\theta_i \\ \sin\theta_i \end{bmatrix}\right)$$

The best fit ellipse parameters along with the instantaneous measured values p(t) and q(t) are used by microprocessor 678 to decode the instantaneous fine grating position according to equations 1, 2 and 4 above. Microprocessor 678 determines the grating position at time t by splicing the coarse position value obtained from quadrature counter 674 and the fine position value determined by the above described fine decode algorithm so as to appropriately account for the ambiguity that occurs near the switching point of the quadrature counter. The splicing of the fine decode and quadrant counter position produce a single position number as follows. The counter advances by 4 counts for each complete cycle of the P and Q signals. It changes at each zero crossing of the P and Q signals. The fine position decode resolves a single cycle of the P and Q signals into $2^N$ parts. N is typically chosen to be between 6 and 12 to provide sufficient range and resolution. The fine position is thus represented by an N bit number. The most significant 2 bits of the fine position decode and the least significant 2 bits of the quadrature counter are the same if there is no timing skew or amplitude offset between the counter value and the decoded fine position. However, timing skew or amplitude offset can occur if the counter value and fine position decode are derived separately from the P and Q signals, as is required for a cost effective implementation. The quadrants are defined in FIG. 5c. In the first quadrant one the two least significant bits of the counter and the two most significant bits of the fine decode have a value of 00. In the second quadrant these bits have a value of 01, while in the third and fourth quadrants they have a value of 10 and 11, respectively. At quadrant boundaries the counter and fme decode may produce different values for the 2 overlapping bits. This discrepancy is resolved by splicing the counter and fine position values according to the following algorithm:

1) subtract 2 from the counter value;
2) shift the resulting bits left by N–2 positions, where N is defined above;
3) add the fine decode position to the result of step 2;
4) set the least significant N bits of the result of step 3 to 0;
5) replace the least significant N bits with the fine decode position.

The resultant grating position is used by actuator position controller 128 (FIG. 1) in concert with the actuator voice coil to position radially one or more magnetic recording heads 112 over their corresponding disk surfaces.

Turning again to FIG. 6, fine decode electronics are shown which perform the computations described above. In the preferred embodiment, the fine decode electronics include summing amplifiers 604 and 654, ADC's 608 and 658, bias detectors 610 and 660, dividers 616 and 666, RAM 622 and 672, accumulators 618 and 668, DACs 620 and 670, and quad counter 674. Signal 690 required to cancel the DC bias offsets $B_q$ is provided by DAC 670. The amplitude of the required signal as a function of grating position is provided by RAM 672 using previously determined values. Quadrature counter 674 serves to address the appropriate memory location in RAM 672 so that a stored value can be passed to DAC 670. Similarly, signal 692 required to cancel the DC bias offsets $B_p$ is provided by DAC 620 using previously determined values stored in RAM 622. RAM 622 is also addressed by quadrature counter 674.

The values stored in RAM 672 and 622, which are indicative respectively of the amplitude of signals 690 and 692 as a function of grating position, are obtained by sweeping diffraction grating 120a from one initial extreme position to the other extreme position. The grating is first positioned at an initial extreme position by actuator servo controller 128 working in concert with actuator voice coil 118 and actuator 114. The initial extreme position may be determined by one of the crash stops typically present in modern disk drives. By applying the appropriate electrical drive to voice coil 118 the grating is made to move cyclically. The position amplitude is such that one or more sinusoidal electrical current signal cycles is generated by photo detectors 314 and 318. Under the direction of microprocessor 678, ADC 658 samples the resultant waveform 680. The sample frequency is set to be sufficiently higher than the frequency of resultant waveform 680 to ensure that the maximum and minimum amplitudes are accurately captured by bias detector 660. The bias detector averages the maximum and minimum values to determine the electrical current DC offset value $B'_q$. A fraction of the resultant DC offset value $B'_q$ is passed to accumulator 668 by divider 666. The accumulator value is stored in RAM 672 and passed to DAC 670. The DAC generates signal 690 which in turn reduces the DC offset value of signal 680. This process is repeated under the direction of microprocessor 678 until the DC offset of signal 680 is reduced to near zero. The resultant accumulator value is stored in RAM 672.

Similarly and simultaneously with the above sequence, microprocessor 678 directs ADC 608 to sample resultant waveform 682. The maximum and minimum amplitudes of waveform 682 are accurately captured by bias detector 610. The bias detector averages the maximum and minimum values to determine the current DC offset value $B'_p$. A fraction of the resultant DC offset value $B'_p$ is passed to accumulator 618 by divider 616. The current accumulator value is stored in RAM 622 and passed to DAC 620. The DAC generates signal 692 which in turn reduces the DC offset value of signal 682. This process is repeated under direction of microprocessor 678 until the DC offset of signal 682 is also reduced to near zero. The resultant accumulator value is stored in RAM 622. The use of dividers 666 and 616 ensures that the correct bias offset signal values 690 and 692, respectively, are approached asymptomatically even in the presence of gain errors that may exist in ADC 658 and ADC 608 as well as in DAC 670 and DAC 620.

Quadrature counter 674 is fully functional once the DC offsets in the signal outputs from summing amplifiers 654 and 604 are compensated for by using the above described procedure. Quadrature counter 674 can then provide the coarse position signal to microprocessor 678 and the absolute memory address to RAM 672 and RAM 622. Under low gain servo control and by using only the coarse position signal provided by quadrature counter 674, actuator servo controller 128 working with actuator voice coil 118 and actuator 114 gradually sweeps the diffraction grating from the initial extreme position toward the other extreme position. During the motion, microprocessor 678, with the aid of quadrature counter 674, directs ADC 658 and bias detector 660 to measure the instantaneous bias value $B'_q$ of signal 680. Signal $B'_q$ is divided by divider 666 and added to the previous accumulator value stored in accumulator 668. The resultant accumulator value is used by DAC 670 to generate signal 690 which is added by summing amplifier 654 to the output from amplifier 652. The accumulator value is also stored in RAM 672 at the memory address determined by the quadrature counter value. Thus the accumulator value required to compensate for the DC offset in signal 520 is stored in RAM 672 for each desired grating position. Similarly and simultaneously to the above process, the accumulator value required to compensate for the DC offset in signal 521 is stored in RAM 622 for each desired grating position by microprocessor 678, quadrature counter 674, ADC 608, bias detector 610, divider 616, accumulator 618, DAC 620 and RAM 622. The DC offset bias values $B_q$ and $B_p$ are expected to vary gradually over a narrow range with grating position due to: a) the expected small amplitude and long spatial frequency variations of the diffraction grating efficiency; b) the expected gradual variation of the optical position sensor detection efficiency with grating translation; and c) the designed laser beam area impinging on the grating being much larger than the total area of the illuminated defects at any given grating position. The gradual variation in the DC offset values may be used to advantage to improve the signal-to-noise of the bias values $B_p$ and $B_q$ stored in RAM 622 and RAM 672, respectively, by making the divider value N of dividers 666 and 616 in FIG. 6 be greater than 1. This has the effect of storing a running average in RAM 622 and 672 and thus reduces the sensitivity to noise.

With respect to the above-described preferred implementation of the fine decode electronics, it is to be noted that many alternative embodiments are available which are considered to be encompassed by the present invention. For example, bias cancellation may be implemented in software rather than in hardware while all the decode function may be performed in hardware.

III. Write Clock Sub-System

Figure 7B:
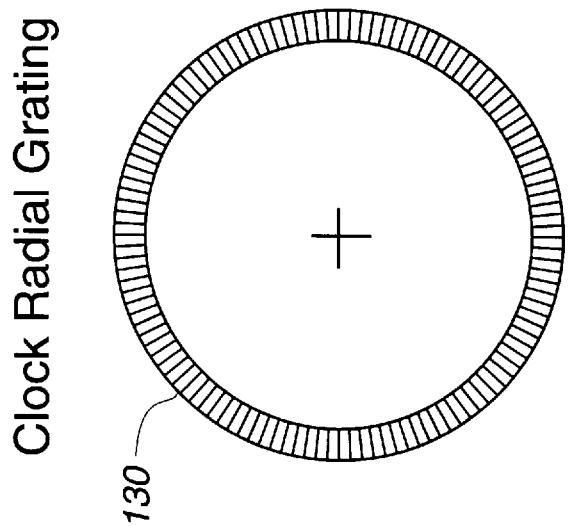
FIG. 7b illustrates a radial diffraction grating for use with the write clock sub-system.
Figure 7A:
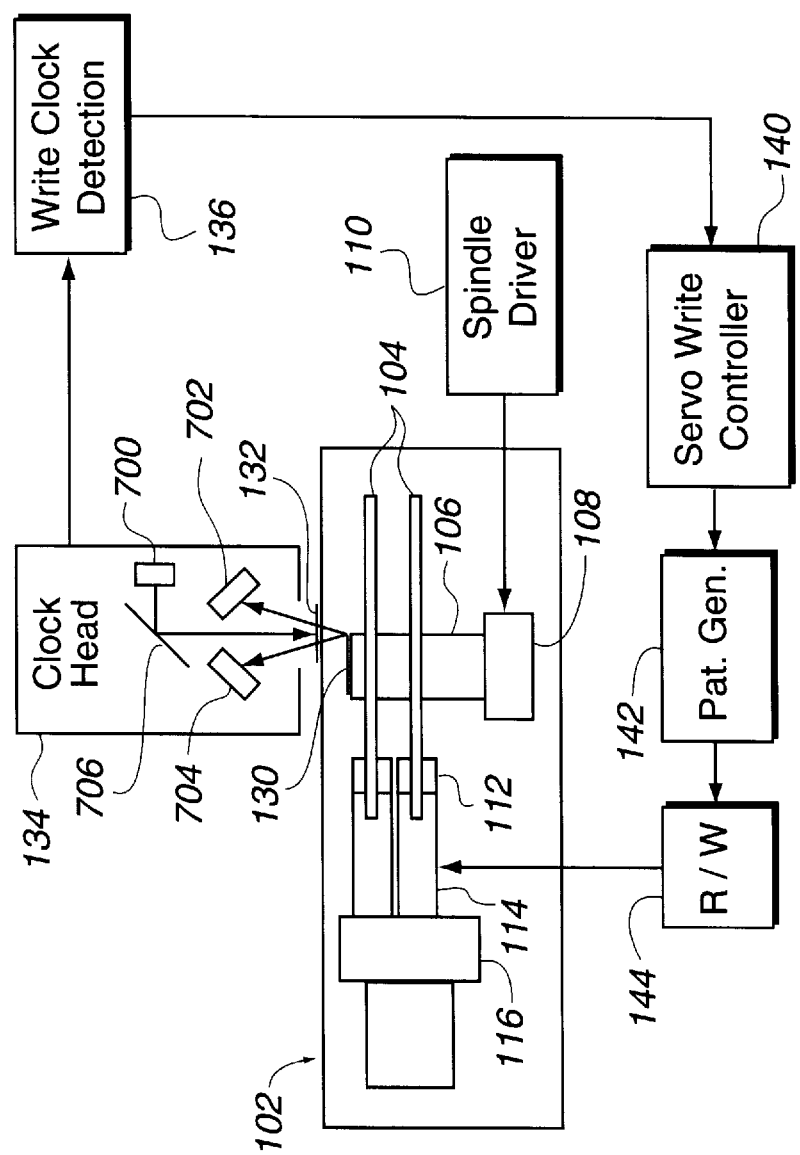
FIG. 7a illustrates in block diagram form the reference write clock sub-system of the present invention.

The write clock sub-system, shown schematically in FIG. 7a, includes optical clock sensor 134 which is comprised of semiconductor laser source 700, laser beam deflector 706 and detection optics 702 and 704, grating 130, optical window 132, and write clock signal processing electronics 136. Planar diffraction grating 130, shown in FIG. 7b, is in the shape of an annulus having enough width to accommodate the laser beam diameter and the centration tolerance with respect to the spindle hub center of rotation. The grating lines converge to the center of the annulus. The radial grating at the radial position where the laser beam impinges on its surface has a pitch approximately twice the wavelength of the laser beam and a depth approximately ¼ the wavelength of the laser beam. To maximize the performance of the optical write clock sensor, the grating pitch and depth are preferably selected to optimize and equalize the efficiency of the 1st order diffraction pattern for both the p-polarized and s-polarized laser beams and to minimize the diffraction efficiency of all other diffraction orders. It is advantageous to use a small grating and to select a low density substrate or even preferably to replicate the grating directly onto the spindle hub surface. The sub-system generates a precise write clock timing signal and a disk index timing signal that is "phase-locked" to the disk(s) surface(s). The total number of clock cycles per revolution is determined by the number of lines on the radial grating. The detection electronics are designed so that any extra pulses or missing pulses due to grating defects and/or electronics noise are compensated for. The exact circumferential positions of the recorded magnetic marks produced by the servo-writer is controlled by the write clock system, which produces the required clock and disk index signals used to precisely clock the data pattern stored in pattern generator 142.

A. Optical Write Head Sensor

Figure 8:
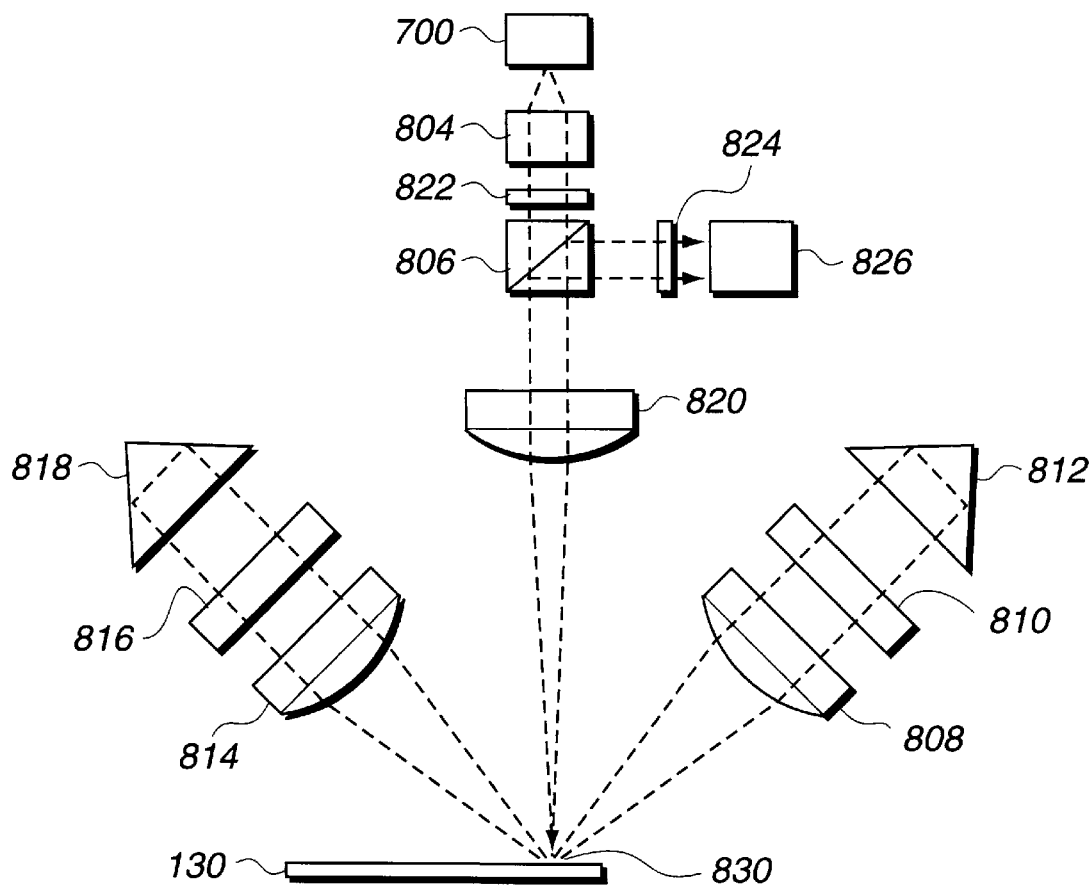
FIG. 8 illustrates a cross-sectional view of a reference clock sensor for use with a radial grating in accordance with the present invention.

Shown in FIG. 8 is a cross-sectional diagram illustrating the detailed design of optical write clock sensor 134 configured for use with a radial grating to generate a reference write clock in accordance with the present invention.

The measurement system includes semiconductor laser 700, collimator lens 804, polarizers 822 and 824, polarizing beam splitter 806, spherical lenses 808, 814, and 820, photo detector 826, quarter wave plates 810 and 816, corner cube reflectors 812 and 818, and radial grating 130. In operation, the laser beam generated by laser diode 700 passes through collimator 804, polarizer 822 and polarizing beam splitter 806. Polarizer 822 and polarizing beam splitter 806 block any S-polarized component and pass the P-polarized component on to lens 820. The resultant beam substantially is focused to within about 5% by lens 820 onto spot 830 on radial grating 130. In the preferred embodiment, the beam incident on lens 820 is offset from the optical axis of lens 820 by approximately 1.5 mm so that the 0 order beam reflected from the grating is offset by approximately 3 mm from the incident laser beam after it passes back through lens 820. As a result it can be easily blocked from returning to laser diode 802, thus avoiding the known sensitivity of diode lasers to light fed back into their cavities. Also, the P-polarized 0 order reflected beam from the grating is passed by polarizing beam splitter 806 and not reflected towards photo detector 826 so as not to degrade its performance.

The +1 and −1 order diffracted laser beams emerge from the grating in the direction of their respective wavefront reconstruction optics. In particular, the resultant +1 order diffracted laser beam passes through spherical lens 808 which collimates it, then passes through quarter wave plate 810, is reflected back by corner cube reflector 812 and again passes through, in turn, quarter wave plate 810 and lens 808. Lens 808 substantially focuses the resultant beam onto the grating at spot 830. The resultant beam is diffracted by grating 130 toward lens 820. Lens 820 re-collimates the beam and directs it to polarizing beam splitter 806. Likewise, the resultant '1 order diffracted laser beam passes through spherical lens 814 which collimates it, then passes through quarter wave plate 816, is reflected back by corner cube reflector 818 and again passes through, in turn, quarter wave plate 816 and lens 814. Lens 814 substantially focuses the resultant beam onto the grating at spot 830 so as to overlap with the +1 order beam also returned to spot 830 by the other set of optics. The resultant beam is diffracted by grating 130 toward lens 820. Lens 820 re-collimates the beam and directs it to polarizing beam splitter 806.

The optical alignment of the optical components is such that the resultant collimated +1 and −1 order diffracted beams are coincident and collinear. Quarter wave plates 810 and 816 serve to make the resultant beam s-polarized. The combined laser beam exhibits interference fringes which change intensity as the radial grating is rotated. Polarizing beam splitter 806 directs the combined beams to polarizer 824 and subsequently to photo detector 826. Polarizer 824 serves to increase the extinction capability of polarizing beam splitter 806 to the p-polarized light beam while passing the s-polarized light beam to photo detector 826. The electrical signals generated by photo detector 826 are a sinusoidal function of time and are synchronized to the diffraction lines on the radial grating and thus to the spindle rotation. Rotation of the grating by 1 line pitch results in 4 complete cycles of the electrical signal. The resultant signal is subsequently processed to produce a highly accurate and repeatable reference write clock signal which is synchronous with the spindle rotation.

B. Detection Electronics

The instantaneous frequency of the raw reference write clock, hereinafter referred to as the raw clock, produced at the output of photo detector 826, is determined by the instantaneous spindle rotation velocity and the average pitch of the radial grating illuminated by the laser beam from the reference write clock optical head. Centration error of radial grating 130 with respect to the spindle rotation axis modulates the average radial grating pitch illuminated by the laser beam and thus the instantaneous frequency of the raw clock. The resultant modulation is sinusoidal with a frequency equal to the spindle rotation frequency. The amplitude is determined by the grating centration error and the phase is determined by the direction of the grating centration error with respect to the position of the reference write clock optical head. Both the magnitude and phase of the frequency modulation is repeatable for each spindle revolution. For example, at a grating radius of 10 mm a 1% centration error due to a 100 µm missalignment of the grating results in a 1% frequency modulation amplitude of the raw clock. The raw clock frequency is also modulated by any repeatable and non-repeatable spindle runout as well as by any circumferential non-uniformity in the grating line pitch.

Aside from electronic noise, the above effects combine to add additional repeatable and non-repeatable error to the raw clock. By the proper design and manufacture of the spindle and the grating their contributions can be made suitably small. However, in most practical applications, it would be economically unattractive to make the contributions due to grating centration error also suitably small. Thus, the present invention provides two approaches which significantly reduce the repeatable modulation of the raw clock due to the grating centration error. The first approach is based on electronics which accurately measure the repeatable amplitude and phase of the raw clock modulation and electronically compensate for it; the second makes use of two write clock optical heads positioned on opposite sides of the grating but at nominally the same grating radius to generate two raw clocks. The two clock signals are mixed electronically to produce a compensated write reference clock, hereinafter referred to as a compensated clock.

Figure 9:
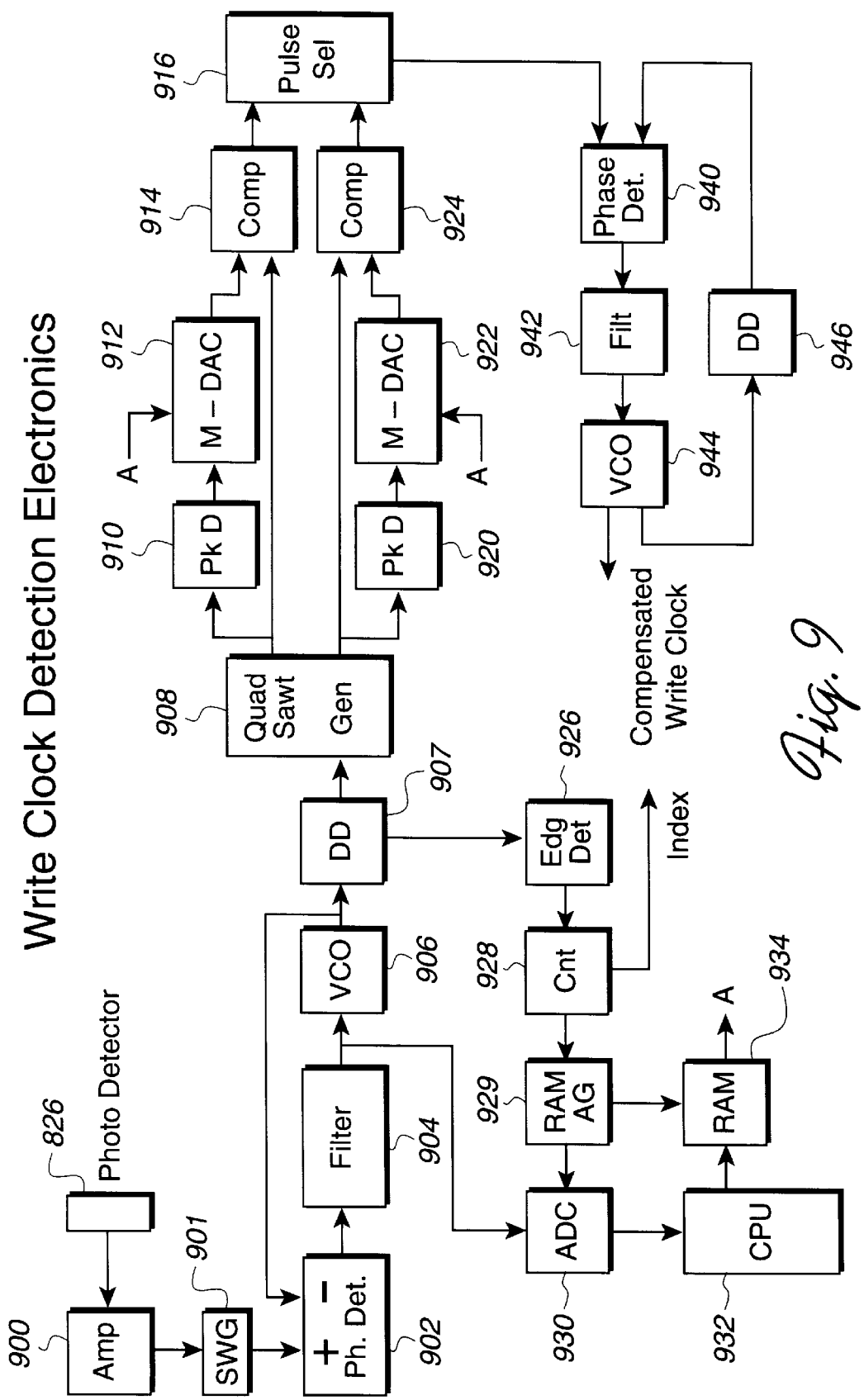
FIG. 9 illustrates in block diagram form the write clock detection electronics for the servo-writing system of the present invention.

The raw clock detection and compensation electronics for the first approach are shown in block diagram form in FIG. 9. The raw clock detection electronics includes photo detector 826, band pass and automatic gain controlled amplifier 900, square wave generator 901, phase detector 902, filter 904, voltage controlled oscillator (VCO) 906 and digital divider (DD) 907. The amplitude and phase of the frequency modulation due to the grating centration error are measured using these electronics along with the measurement electronics. The measurement electronics include analog-to-digital converter (ADC) 930, edge detector 926, digital counter 928, RAM address generator (RAM-AG) 929 and processing unit 932. Compensation of the raw clock is performed by the raw clock detection electronics along with the quadrature timing adjustment generator using information stored in RAM 934. The quadrature timing adjustment generator includes edge detector 926, digital counter 928, RAM-AG 929, RAM 934, processing unit 932, quadrature sawtooth generator (QSG) 908, peak detectors 910 and 920, multiplying digital-to-analog converters (M-DAC) 912 and 922, comparators 914 and 924, and pulse selector 916. The compensated write clock generator includes phase detector 940, filter 942, VCO 944 and digital divider 946.

In operation, the raw clock from photo detector 826 is passed to amplifier 900. Amplifier 900 band pass filters and automatic gain controls the signal before passing it to square wave generator 901. The band pass filter bandwidth may be relatively narrow since the required write reference clock information is carried by the fundamental frequency component. The desired band pass filter bandwidth is primarily determined by the expected grating centration error and the spindle RPM variations. The automatic gain control compensates for any circumferential optical grating efficiency variations which otherwise would adversely affect the performance of square wave generator 901 and subsequently phase detector 902. Square wave generator 901, phase detector 902, filter 904 and VCO 906 collectively function as a classic phase-lock loop to generate a raw clock signal that is synchronous with the grating lines on grating 130. The phase-lock loop also functions to reduce the effect of electronic noise and to compensate for any missing or extra zero crossings occurring in the output signal of amplifier 900. Grating defects, for example, may lead to missing or extra zero crossings which would lead to the index counter not being synchronized with the disk spindle.

The raw clock from VCO 906 is accurately synchronized to the grating lines and the spindle rotation. The timing jitter of the raw clock is inherently very small due to the high signal-to-noise ratio of the electrical signal from photo detector 826 and due to the noise and grating defect abatement provided by the raw clock detection electronics. If required the raw clock frequency can be divided and/or multiplied internal or external to the raw clock detection electronics using known methods.

The magnitude and phase of the raw clock frequency modulation is measured as follows. The transition edges of the raw clock are detected by edge detector 926 and counted by digital counter 928. In particular, digital counter 928 produces a stationary spindle index by counting the total number of transitions per complete spindle revolution. The total number of transitions per complete spindle revolution is determined by the number of grating lines and any frequency division or multiplication performed in the raw clock detection electronics. The transition edges are also passed to ADC 930 and to RAM Address Generator (RAM-AG) 929. ADC 930 uses the transition edges to determine the data acquisition timing while RAM-AG 929 used them to determine the proper data address for RAM 934. On a given spindle revolution the instantaneous input to VCO 906 and thus the instantaneous output frequency of DD 907 is synchronously sampled by ADC 930 and passed to processing unit 932 for storage and processing. Processing unit 932 uses data obtained from multiple complete spindle revolutions to compute the best fit amplitude and phase of the frequency modulation due to the grating eccentricity error. The computations are performed using statistical principles well known in the art and thus will not be described in detail. The number of complete spindle revolutions as well the number of data samples taken on a given spindle revolution are chosen so as to compensate for any spindle velocity variations and to average out noise. Processing unit 932 makes use of the best fit amplitude and phase to calculate the synchronous timing adjustments required for each raw clock cycle to compensate for the grating centration error. The appropriate representation of the synchronous timing adjustments is stored in RAM 934, which is addressed using RAM-AG 929. The value stored in RAM 934 is then used to make the instantaneous timing adjustments using the quadrature timing adjustment generator.

Figure 10:
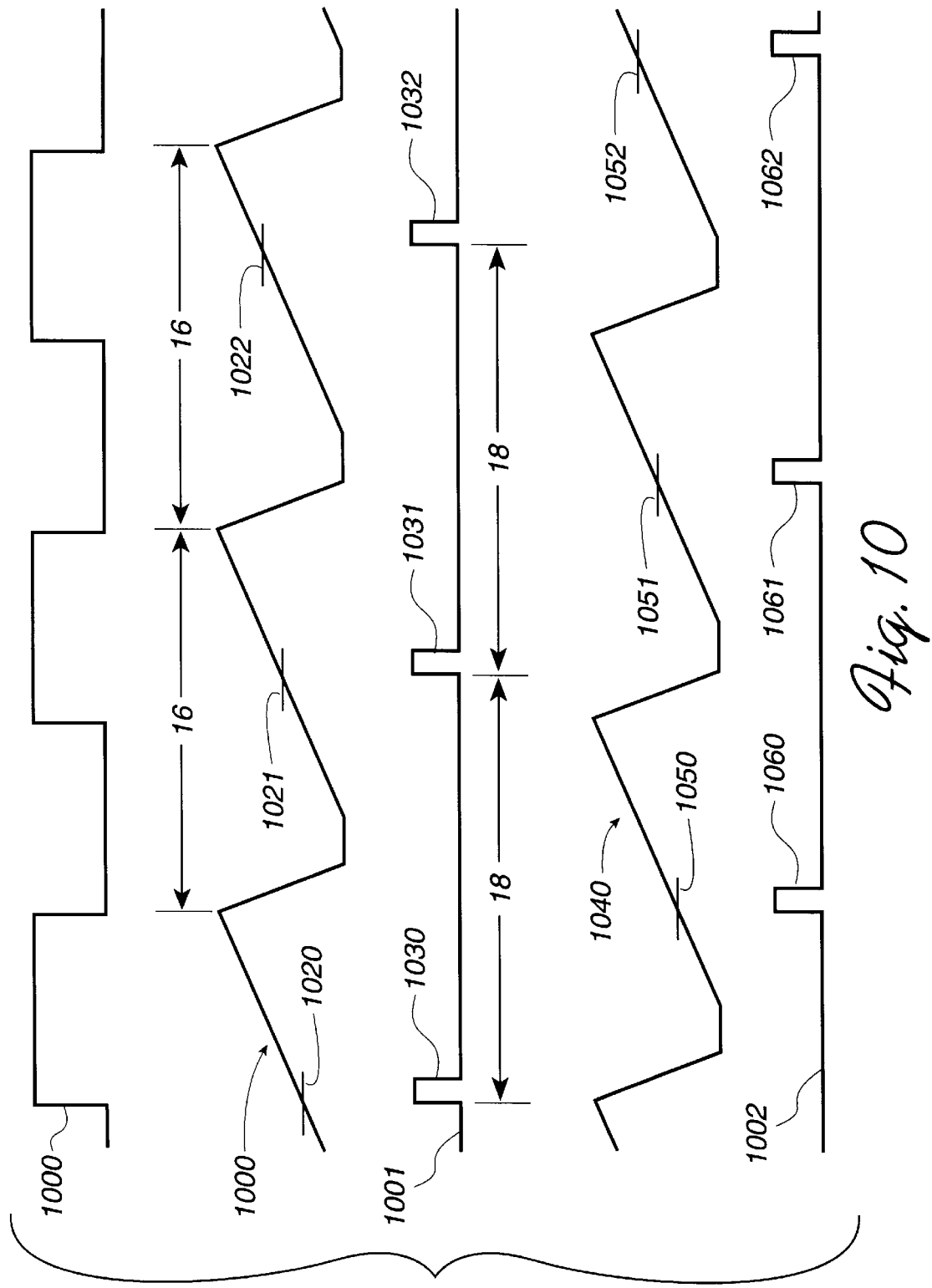
FIG. 10 illustrates in timing diagram form the waveforms generated by the quadrature sawtooth generator.

The quadrature timing adjustment generator fimction is provided by QSG 908, peak detectors 910 and 920, M-DAC 912 and 922 and comparators 914 and 924. QSG 908 generates quadrature sawtooth waveforms synchronous with the raw clock from DD 907. The raw clock 1000, the quadrature sawtooth waveforms 1010 and 1040 as well as the output waveforms from comparators 914 and 924, 1001 and 1002, respectively, are shown in timing diagram form in FIG. 10. The output of M-DAC 912 for sequential cycles of waveforms 1010 is shown schematically by horizontal lines 1020, 1021 and 1022. Comparator 914 produces waveform 1001 having sequential pulses 1030, 1031, and 1032 when the sawtooth waveform amplitude is equal to the preset outputs 1020, 1021 and 1022, respectively, of M-DAC 912. Likewise, the output of M-DAC 922 for sequential cycles of waveforms 1040 is shown schematically by horizontal lines 1050, 1051 and 1052. Comparator 924 produces waveform 1002 having sequential pulses 1060, 1061 and 1062 when the sawtooth waveform amplitude is equal to the preset outputs 1050, 1051 and 1052, respectively, of M-DAC 922. In the example shown schematically in FIG. 10, the raw clock has a period of 16 units while the comparator's output has a period of 18 units. Similarly, by the proper choice of output sequence values from M-DAC's 912 and 922 the output values from comparators 914 and 924 may have a period smaller than the raw clock. Thus, by programming a proper sequence of values in RAM 934 the pulse period of waveforms 1001 and 1002 may be kept constant as the raw clock period varies with spindle rotation.

The output value of M-DAC 912 for each cycle of the raw clock is determined by the digital value stored in RAM 934 and is normalized to the peak of the previous sawtooth waveform cycle using the output of peak detector 910. Similarly, the output value of M-DAC 922 for each cycle of the raw clock is determined by the digital value stored in RAM 934 and is normalized to the peak of the previous sawtooth waveform cycle using the output of peak detector 920. The normalization provided by M-DAC 912, M-DAC 922, peak detector 910 and peak detector 920 insures that sawtooth amplitude variations caused by raw clock frequency variations are compensated for cycle by cycle. By synchronously changing the output value of RAM 934 under the direction of RAM address generator 929, the output pulses from comparators 914 and 924 can be positioned anywhere between the beginning and end of a given sawtooth waveform cycle. Thus, the position of the pulses on waveform 1001 and 1002 can be continuously and predictably moved within a waveform cycle and cycle to cycle, to compensate for the frequency variations due to the grating centration error.

In principle, either waveform 1001 or 1002 can provide the compensation clock if the sawtooth waveform generated by QSG 908 is close enough to ideal, that is, if the sawtooth waveform from QSG 908 has a transition time from its maximum to zero which is much smaller than the desired minimum delay interval and is highly linear throughout the entire range. However, this requirement would unnecessarily increase the performance requirements and cost of the components used to implement the QSG, and also would complicate its design. In accordance with the invention, the transition timing requirement as well as the linearity requirement over the entire range are significantly relaxed by using a quadrature sawtooth generator and appropriately selecting a pulse from either waveform 1001 or 1002 using pulse selector 916. The only remaining critical requirement on the quadrature waveforms is that the central parts of the waveforms be highly linear and that their slopes be well matched. These requirements can be achieved in a cost effective manner using techniques well known in the art. The compensated clock is produced by pulse selector 916 and the phase-lock loop comprising phase detector 940, filter 942, VCO 944 and digital divider 946.

In typical phase locked loop applications the linearity of VCO 906 may not be critical. However, in the context of the present invention the linearity of VCO 906 is very important since it is used to accurately measure the magnitude and phase of the frequency modulation of the raw clock. The voltage-to-frequency transfer characteristics of the VCO are measured by feeding square wave generator 901 in turn with two or more waveforms having accurately known frequencies that span the desired operating range. The input frequencies may be produced, for example, by a crystal controlled clock. The resultant voltage at the input to VCO 906 is sampled multiple times for each input frequency using ADC 930. The sampled values are then fitted to a straight line to calculate the voltage-to-frequency transfer characteristics in accordance with design techniques known in the art.

Figure 11:
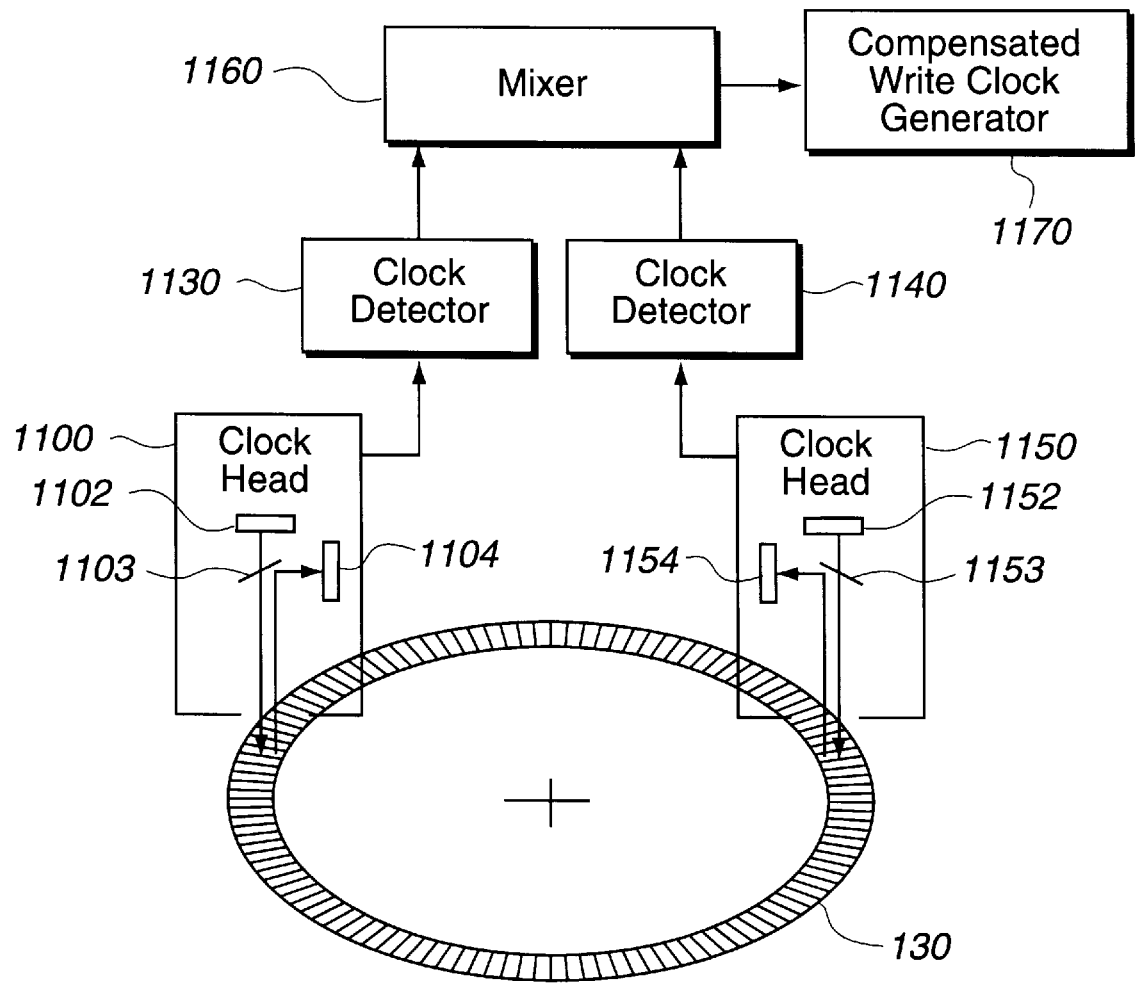
FIG. 11 illustrates in block diagram form an alternative embodiment of the write clock sub-system using two optical clock heads and an electronic mixer.

The second technique for implementing the raw clock detection and compensation, shown in FIG. 11, uses two separate clock heads positioned 180° apart (on opposite sides of the grating center). The write clock sub-system, in accordance with this technique, includes optical clock heads

1100 and 1150, grating 130, raw clock detection electronics 1130 and 1140 and write clock mixer 1160 and compensated write clock generator 1170. Optical clock head 1100 includes semiconductor laser 1102, polarizing beam splitter 1103, and photo detector 1104. Similarly, optical clock head 1150 includes semiconductor laser 1152, polarizing beam splitter 1153, and photo detector 1154. The complete design for the optical clock heads is shown in FIG. 8 above. Each head is coupled to its respective clock detection electronics. The design of clock detection electronics 1130 and 1140 is equivalent to the design shown in FIG. 9, including amplifier 900, square wave generator 901, phase detector 902, filter 904 and VCO 906. The two synchronized raw grating clocks produced by clock detection electronics 1130 and 1140 are combined in mixer 1160, producing the output signal:

$$\cos(f_1) \times \cos(f_2) = 0.5[\cos(f_1+f_2) + \cos(f_1 f_2)]$$

Compensated write clock detector 1170 removes the difference frequency term using a high pass filter and processes the remaining sum frequency term to produce a composite write clock. Due to the cancelling effect of the above combinations, the resulting composite clock exhibits no first order frequency error attributable to the grating centration error. The magnitude of the remaining second order term is much lower than the first order term, being proportional to the square of the centration error. For a worst case 1% grating centration error, this technique results in a maximum 0.01% error in the resultant compensated write reference clock frequency which is adequate for most servo-writer applications.

Some applications may not require full correction of the reference clock frequency. In many instances, only a small amount of information is required to be written synchronously. For example, in writing sector-servo patterns on a data recording disk, any single servo sector is written with a synchronous clock for track to track alignment, but the synchronization requirement is relaxed between servo sectors. In such case, it may be sufficient to ensure that the time between servo sectors is corrected, without actually correcting the reference clock frequency. A crystal-controlled reference clock may be used to calibrate the sector length measured using the uncompensated write reference clock, thereby producing equal length sectors. The accuracy of the calibration need only be commensurate with the spindle RPM control accuracy, which itself may be improved if desired by averaging data taken over multiple spindle revolutions.

IV. Wavefront Reconstruction Optics

The reflective diffraction gratings included in the actuator position sensor and reference write clock generator described previously are provided with linearly and radially disposed diffraction patterns, respectively. As the grating rotates with respect to the incident light beam, the phase of the reflected diffraction patterns shift with respect to the phase of the incident beams. This phase shift, measured by suitable photo-detectors, provides the basis for accurately determining the actuator position and reference write clock signal.

The problem associated with using the diffraction pattern from a linear diffraction grating with a rotary actuator, prevalent in modern disk drives, is that the diffracted laser beam rotates (yaws) with respect to the incident laser beam as the actuator rotates about its pivot. The optical system design needs to accommodate the actuator rotation, which can be up to ±20°. On the other hand, the diffracted laser beam does not rotate if one uses a radial instead of a linear diffraction grating. However, the problem associated with a radial diffraction grating is appreciable wavefront aberration of the diffraction patterns caused by the variable grating line pitch under the incident laser beam. In a typical optical system, the + and − order diffraction patterns are reflected back to a spot in the grating adjacent to the incident source laser beam and then diffracted normal to the grating surface onto photodetectors for phase detection. The combined + and − order diffraction patterns of the resultant laser beam exhibits substantial wavefront aberrations. This results in poor diffraction fringe contrast which degrades performance of the position detection system. It also results in a detection system which is very sensitive to misalignment of the optics with respect to the grating since the two highly aberrated resultant laser beams must be kept precisely co-linear as the grating is rotated.

There is no known prior art design compatible with the high yaw angles that result from the rotation of a linear grating. The prior art relating to angular position sensing with radial gratings has either neglected correcting the resultant wavefront aberrations in the diffraction patterns, focused the light into a slit using a cylindrical lens affixed to the grating surface to minimize the aberrations, or re-collimated the aberrated laser beam using a complicated optical system. The second design suffers the serious drawbacks of significantly increasing the weight and cost associated with the grating as well as having a very small useful range, all of which renders it ineffective for use in a disk drive as described in previous sections. The latter design uses a cylindrical lens to remove the astigmatism in the aberrated wavefront. More specifically, for the + order diffracted laser beam, this design uses a wedge prism to bend the laser beam, a pair of cylindrical lenses to correct the aberration, a corner cube to reflect the resultant laser beam, a second wedge prism to bend the laser beam again, and a second pair of cylindrical lenses to convert the light to a conjugated wavefront prior to returning the resultant laser beam to the diffraction grating. Alignment of the two wedge prisms, the two sets of cylindrical lenses, and the corner cube reflector as required to return a collimated + order diffracted beam to the grating at the desired position and with the proper angle is very difficult at best. Aligning the second set of identical optics for the − order diffracted beam such that the resultant laser beam returned to the grating is collimated as well as collinear and coincident with the + order diffracted beam would be extremely difficult. In any case, even if the alignment could be accomplished, it would be very difficult to keep all the optical components properly aligned during normal handling and use. This design is thus very unattractive for practical applications due to the large number of optical components, the complexity of the mechanical stages required to align the optical components, and the difficulty in accomplishing and maintaining the proper alignment.

One final prior art approach is available for minimizing optical wavefront aberrations caused by radial gratings: using a very small diameter laser beam incident on the radial grating. However, for most practical applications, reducing the laser beam diameter is undesirable because the detection system becomes very sensitive to grating defects which invariably are present in low cost, high volume manufactured gratings.

This section focuses on the reconstruction optics of the present invention, which correct the above-mentioned optical problems and permit the optical measurement system to accurately measure relative position for either linear or radial diffraction gratings. The reconstruction optics compensate for the variable yaw angle induced by the linear grating as well as for the optical wavefront aberrations induced by the radial grating. The reconstruction optics design for a linear grating has a limited angular range, determined by practical optical components, while the reconstruction optics design for a radial grating has full 360° angular range.

The reconstruction optics design for a linear diffraction grating includes a first spherical lens and a first plane mirror reflector located on one side of an incident laser beam, and a second spherical lens and a second plane mirror reflector located on the opposite side of the incident laser beam. The plane mirror reflector may be either a front surface reflector or a back surface reflector. The first spherical lens and plane mirror reflector receive the + order diffracted laser beam from the linear diffraction grating, while the second spherical lens and plane mirror reflector receive the − order diffracted laser beam. In turn, they direct their respective laser beams back to the grating such that they are collimated and coincident. The reconstruction optics are aligned such that upon a second diffraction from the grating, the resultant laser beams are co-linear and parallel to, but possibly displaced from, the incident source laser beam. The spatial separation of the resultant laser beam from the incident source laser beam aids the detection process, as described in previous sections. The design is such that the resultant laser beams remain co-linear over a large rotation angle of the grating. The permissible rotation angle is determined primarily by the optical aperture of the lenses and the size of the mirrors. This design is very attractive for practical applications due to the small number of optical components, the low complexity of mechanical stages required to align the optical components, and the ease of accomplishing and maintaining the proper alignment.

The reconstruction optics design for a radial diffraction grating is similar to that described above for the linear grating, except that the plane mirrors are replaced by either roof prisms or roof mirrors (two flat reflective surfaces oriented orthogonal to each other). The reconstruction optics include a first spherical lens and a first roof reflector located on one side of an incident laser beam, and a second spherical lens and a second roof reflector located on the opposite side of the incident laser beam. The first spherical lens and roof reflector receive the + order diffracted laser beam from the radial grating, while the second spherical lens and roof reflector receive the − order diffracted laser beam. In turn, they direct their respective laser beams back to the grating such that they are collimated and coincident. The optics are aligned such that upon a second diffraction from the grating the resultant laser beams are co-linear and parallel to, but possibly displaced from, the incident source laser beam. The spatial separation of the resultant laser beam from the incident source laser beam once again aids the detection process. The design is such that the resultant laser beams remain co-linear as the grating rotates provided the grating is rotated around a pivot point located at a point where the radial grating lines converge. This design completely corrects the wavefront aberrations introduced by the radial grating and is very attractive for practical applications due to the small number of optical components, the low complexity of mechanical stages required to align the optical components, the tolerance to misalignment of the grating, and the ease of accomplishing and maintaining the proper alignment.

Figure 12:
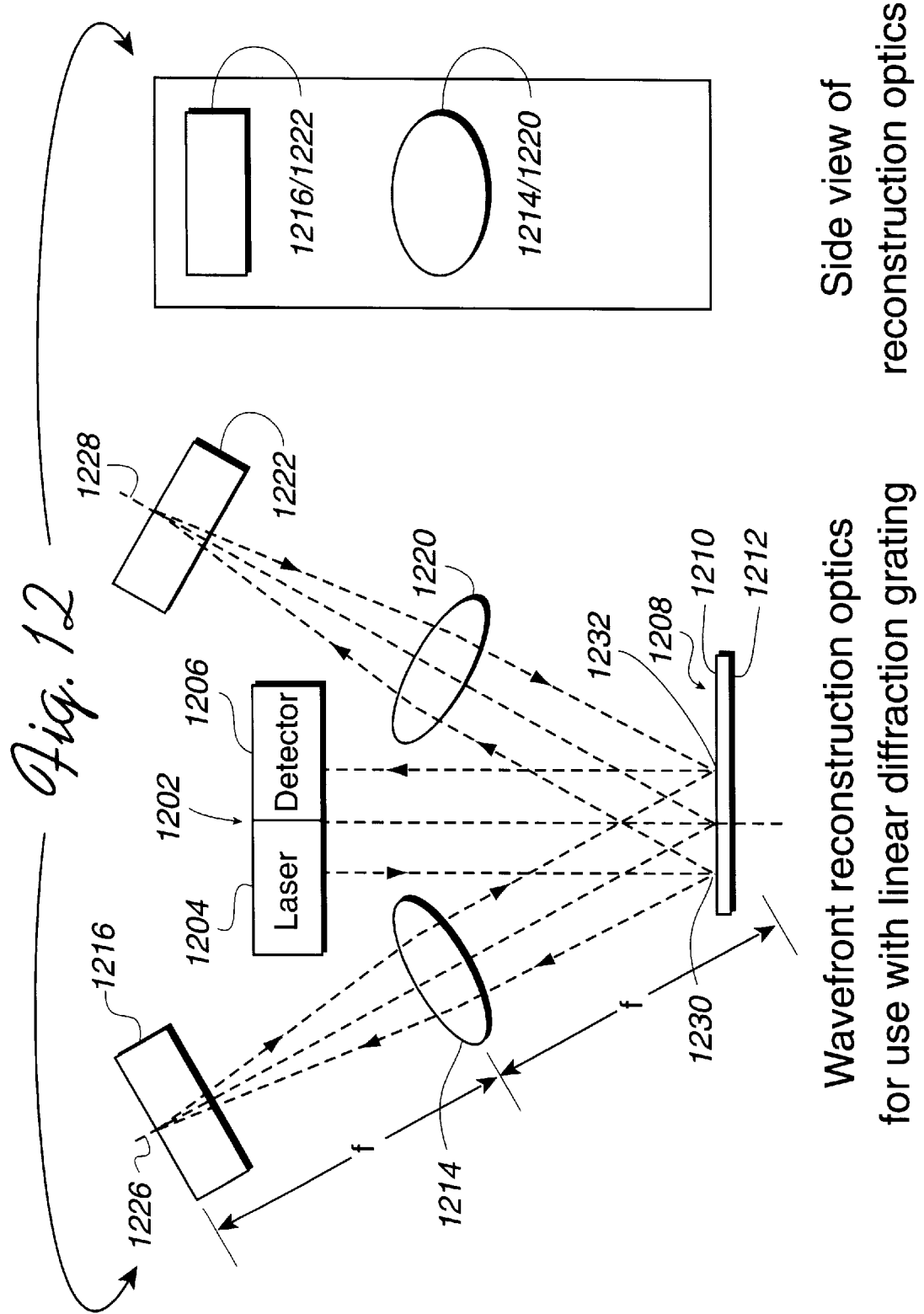
FIG. 12 illustrates a cross-sectional view of wavefront reconstruction optics for use with a linear diffraction grating.

Shown in FIG. 12 is a schematic diagram illustrating an optical measurement system designed for use with a linear grating as the metric, herein referred to as a "linear head", which features −1X telescope wavefront reconstruction optics. Optical head 1202 includes laser light source 1204 and detector 1206. Reflective diffraction grating 1208 has a linear diffraction pattern disposed on its upper surface 1210 and is affixed at its lower surface 1212 to an actuator or spindle stack, as described previously. The reconstruction optics includes spherical lens 1214 and plane mirror reflector 1216 disposed along optical axis 1226, and spherical leans 1220 and plane mirror reflector 1222 disposed along optical axis 1228.

The geometry of the reconstruction optics is established to create the effect of a −1 power telescope. In particular, the centers of spherical lens 1214 and plane mirror reflector 1216 are placed along the nominal center line of the diffracted beam path, denoted as optical axis 1226. Spherical lens 1214 is positioned at a distance f from the midpoint between spots 1230 and 1232 on diffraction grating 1208, as measured along optical axis 1226. The distance f is set equal to the focal length of spherical lens 1214. Additionally, plane mirror reflector 1216 is positioned at a distance f from spherical lens 1214, as measured along optical axis 1226. Similar to spherical lens 1214 and plane mirror reflector 1216, spherical lens 1220 and plane mirror reflector 1222 are placed at increments equal to one focal length of spherical lens 1220 from diffraction grating 1208, with their centers on the nominal center line of the diffracted beam path, denoted as optical axis 1228.

In operation, a laser beam originating from laser source 1204 impinges onto linear diffraction grating 1208 at normal incidence on spot 1230. The resultant + and − order diffracted laser beams emerge in the direction of their respective wavefront reconstruction optics. In particular, the resultant + order diffracted laser beam passes through spherical lens 1220, is focused onto plane mirror 1222 and reflected back through lens 1220 which re-collimates the beam and directs it to diffraction grating 1208 on spot 1232. The grating, in turn, diffracts the resultant beams in the direction of detector 1206. The above-described design and placement of plane mirror 1222 and lens 1220 ensure that the resultant beam is parallel to, but displaced in position from, the source laser beam. Simultaneously, the − order diffracted laser beam passes through spherical lens 1214, is focused onto plane mirror 1216, and is reflected back through lens 1214 which re-collimates the beam and directs it to diffraction grating 1208 at spot 1232. The grating, in turn, diffracts the resultant beams in the direction of detector 1206. The above-described design and placement of plane mirror 1216 and lens 1214 ensure that the resultant beam is coincident and collinear with the + order diffracted beam, and also is directed toward detector 1206. The two resultant + and − order wavefronts combine into a fully reconstructed collimated light beam which emerges in the direction of detector 1206.

The above-described design renders the reconstruction optics insensitive to the linear grating yaw angle relative to the optical head. This, in turn, obviates the need for accurate alignment when mounting a linear diffraction grating on an actuator, and when positioning an optical head relative to a disk drive for use in providing actuator position measurement. For disk drives employing rotary actuators, the design provides a means to accurately measure the position of the rotary actuator using a linear grating. In practice, the reconstruction optics shown in FIG. 12 may be used with linear diffraction gratings having a range of line pitch and can provide yaw angle insensitivity up to approximately ±20°. The permissible yaw angle is limited by the numerical aperture, "flat field" performance and telecintricity of lenses 1214 and 1220, as well as by the size of mirrors 1216 and

1222. The performance of the design is sensitive to changes in the polarization states induced by the optical components since the optical detection method is based on the traditional "single frequency interferometer" or "circular polarization interferometer". Thus, it is preferable to select optical components which preserve the polarization states of laser beams.

Figure 13:
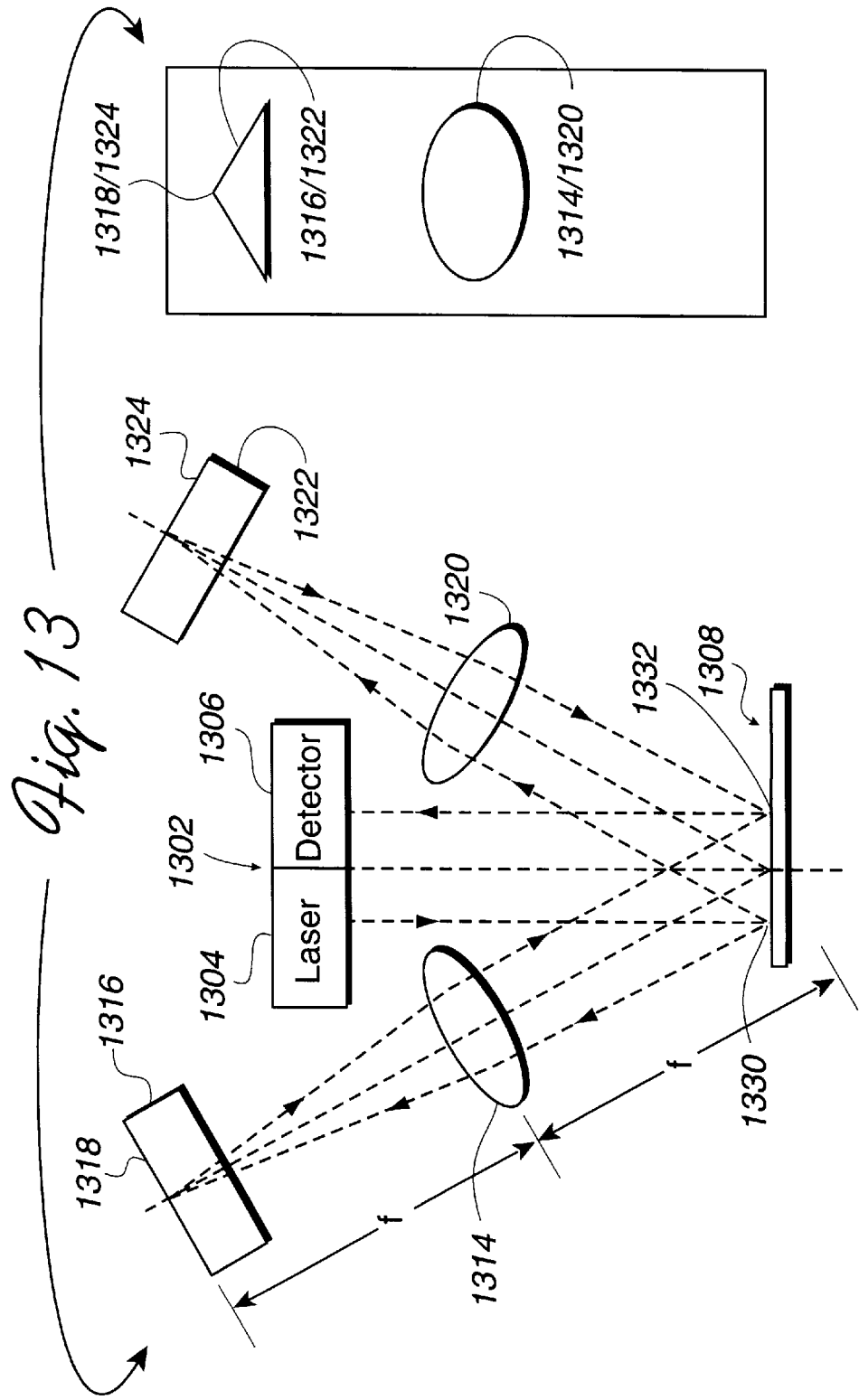
FIG. 13 illustrates a cross-sectional view of wavefront reconstruction optics for use with a radial diffraction grating.

Shown in FIG. 13 is a schematic diagram illustrating an optical measurement system, including wavefront reconstruction optics for use with a radial diffraction grating, herein referred to as a "radial head". This embodiment uses a radial grating as the metric of the measurement. The design is similar to that shown in FIG. 12, except that plane mirror reflectors 1216 and 1222 are replaced with roof reflectors 1316 and 1322. Roof reflectors 1316 and 1322 include roof edges, denoted 1318 and 1324, respectively.

In operation, a laser beam originating from laser source 1304 impinges onto radial diffraction grating 1308 at normal incidence at spot 1330. The resultant + and − order diffracted laser beams emerge in the direction of their respective wavefront reconstruction optics. In particular, the resultant + order diffracted laser beam passes through spherical lens 1320, which changes the resultant aberrated wavefront from spot 1330 on the grating into a Fourier transformed wavefront directed toward roof reflector 1322. Roof reflector 1322 reverses the beam propagation direction and flips the image upside down with respect to its roof edge. The beam then passes again through spherical lens 1320, which once again Fourier transforms the wavefront, and is directed at spot 1332 on radial diffraction grating 1308. The dual Fourier transforming of the beam originated from spot 1330, plus the reflection and flipping about the roof axis by roof reflector 1322, produces a beam spot at 1332 whose wavefront is identical to that at spot 1330, except traveling in the opposite direction. Because the diffracted beam leaving the grating at spot 1330 has a wavefront which is itself anti-symmetric about the radial direction of the grating, the beam returning to spot 1332 has a wavefront which is the complex conjugate of that at spot 1330.

Simultaneously, the − order diffracted laser beam passes through spherical lens 1314 and roof reflector 1316, which likewise reshape the aberrated wavefront and redirect the resultant laser beam towards spot 1332. The two resultant + and − order wavefronts re-diffract and combine into a fully reconstructed collimated light beam which emerges in the direction of detector 1306 of optical head 1302. Since the aberrations are themselves anti-symmetric about the radial line passing through the grating center and the grating lines bisect the two beam spots, the effect of the wavefront reconstruction optics is to provide a phase conjugate optical system for wavefronts anti-symmetric about a transverse axis. Because the beam returning to the grating at spot 1332 has a wavefront which is the conjugate of that of the beam leaving the grating at spot 1330, the beam returning to detector 1306 is re-collimated after it is diffracted the second time by the grating.

As with the linear head, the effect of the optical components on the polarization states of the beams is important, as the optical detection scheme for the radial head is the same as that for the linear head. This is further complicated by the fact that typical reflective coatings used for roof reflectors do not preserve polarization states. However, the problem is relatively straightforward to resolve by adopting a well-known 270° phase coating for internal reflections of a right angle prism. For example, a 270° polarization rotation coating for a laser wavelength of 780 nm can be made by applying the following sequence of thin film coatings onto the right angle surfaces of a BK-7 glass prism: 23.45 nm of $TiO_2$, 245.68 nm of $MgF_2$, 16.60 nm of $TiO_2$, 121.11 nm of $MgF_2$. By placing this coating on the two legs of a right angle prism and using the hypotenuse side of the prism as the entrance surface of the roof reflector, the polarization states of the incident light beam are increased by 270° each time the light beam strikes a leg. After the light beam passes through such a roof reflector, its polarization states are increased by 540°, which is equivalent to a 180° variation in polarization states due to the wrap around nature of the polarization states. The resultant 180° rotation in the polarization states is not detrimental to the signal detection method used in the present invention since it merely reverses the circularity of the light beams (left to right or right to left).

Figure 14:
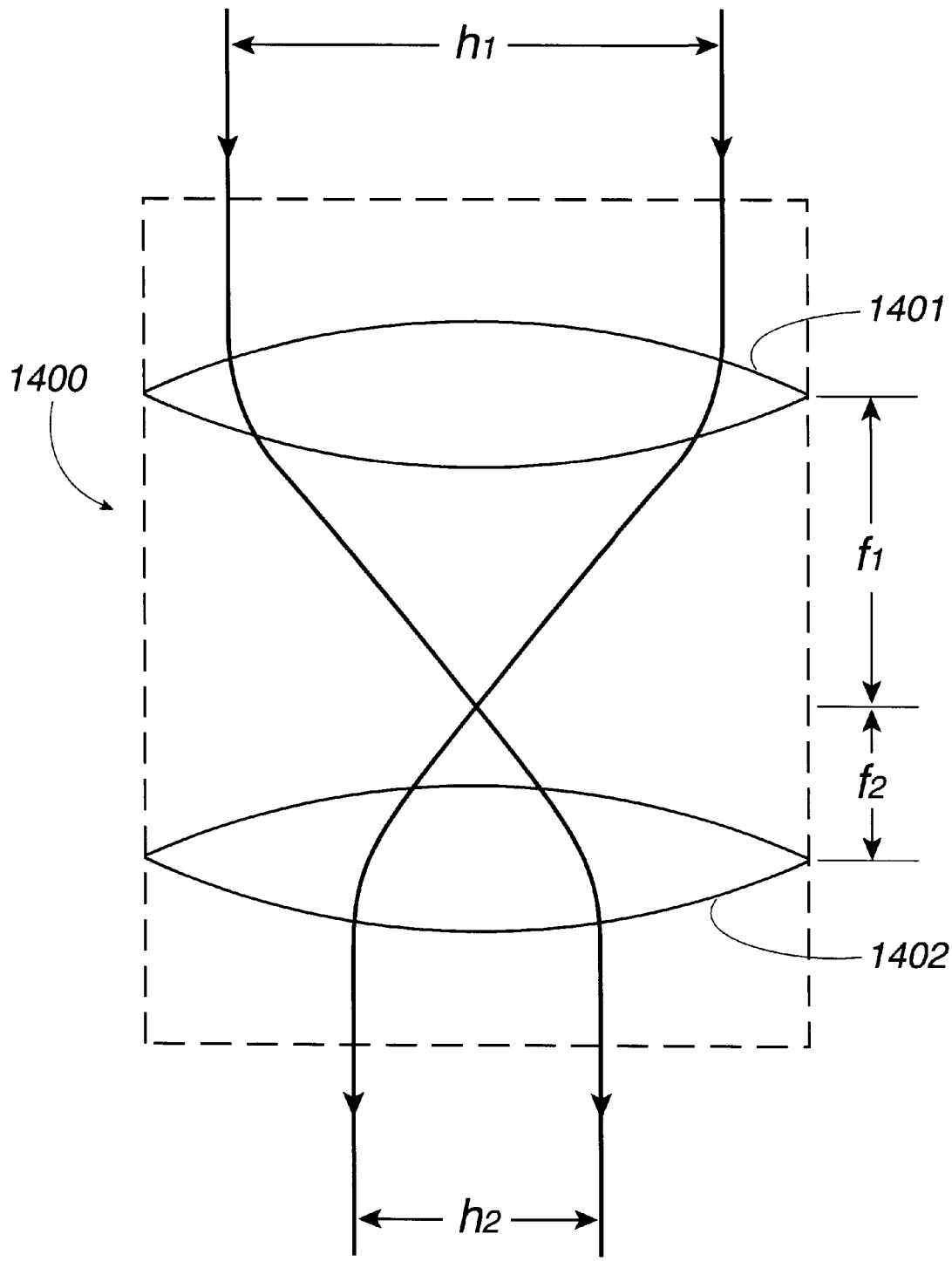
FIG. 14 illustrates a cross-sectional view of a beam compressor for use with the wavefront reconstruction optics of the present invention.

The reconstruction optics of the present invention may be readily adapted to modify the size and separation of the two beam spots on the reflective diffraction grating. For example, if more closely spaced, smaller diameter beams than those produced and detected by the laser/detector assembly are required at the surface of the grating, a beam compressor may be employed. The beam compressor is placed along the center axis between the laser/detector assembly and the grating. A variety of laser beam compressor designs are taught in the art and readily applicable to the present invention. One example is shown schematically in FIG. 14, where beam compressor 1400 includes two lenses 1401 and 1402 separated by a distance equal to the sum of their respective focal lengths $f_1$ and $f_2$. The spot diameter, d, and spot separation, h, is reduced by the ratio γ, which is the ratio of the focal length of lenses 1401 and 1402. Namely, $\gamma \Delta \overset{3}{\vee} f_2|/|f_1|=h_2/h_1=d_2/d_1$, where $h_1$, $d_1$ and $h_2$, $d_2$ represent beam separation and beam diameter, respectively, before and after the beam compressor is placed between laser/detector assembly 1202 and grating 1208 of the linear head shown schematically in FIG. 12 or between laser/detector assembly 1302 and grating 1308 of the radial head shown schematically in FIG. 13. For a given optical head design and size the use of a beam compressor adapts the present invention to a variety of grating sizes and thus a variety of disk drive sizes.

V. Conclusion

In addition to the above-described application to writing servo patterns, the servo-writer system of the present invention may also be used to certify quality and accuracy of servo information recorded on a disk by analyzing read-back signals from magnetic recording heads 112 and read/write electronics 144. Verification may be conducted during the servo-write process or after the process has been completed. The actuator positioning subsystem may also be used to determine actuator position (or certify quality) in a linear actuator disk drive, in which case the grating is selected in the shape of a rectangular strip.

Even more generally, the present invention is considered readily applicable to measurement and control in positioning systems other than those used in disk drives, such as registration systems used in photo lithographic exposure tools, robotic arm positioning systems, tooling machines which operate under computer control, linear or rotational translation stages, or virtually any other mechanical device which can undergo movement.

Also, while the invention has been particularly described and illustrated with reference to a preferred embodiment, it will be understood by those skilled in the art that changes in the description or illustrations may be made with respect to form or detail without departing from the scope of the invention. Accordingly, the present invention is to be considered as encompassing all modifications and variations coming within the scope defined by the following claims.

What is claimed is:

1. A system for measuring the position of an actuator in a data recording disk drive, comprising:

a laser which emits a light beam to the actuator, the light beam having a substantially constant angle of incidence with respect to the actuator;

a reflective diffraction grating, affixed to the actuator, which diffracts the incident light beam;

detection optics which produce first and second signals from the diffracted beam indicative of direction and magnitude of actuator movement during servowriting; and actuator position signal decode electronics, coupled to the detection optics, which receive the first and second signals and produce therefrom a position signal indicative of the actuator position during servowriting, the decode electronics including coarse decode electronics for obtaining coarse actuator position information, and fine decode electronics for further resolving the coarse actuator position information to obtain fine actuator position information, wherein the coarse and fine decode electronics process the first and second signals in determining the fine and coarse position information, the position signal being produced from both the coarse and fine actuator position information.

2. The system as recited in claim 1, wherein the detection optics measure the phase difference between the +1 order diffracted laser beam and the −1 order diffracted laser beam.

3. The system as recited in claim 1, wherein the laser is a semiconductor laser.

4. The system as recited in claim 1, wherein the diffraction grating includes a linear grating pattern.

5. The system as recited in claim 4, wherein the diffraction grating is positioned on the actuator with its grating lines perpendicular to the direction of motion of the actuator near the midpoint of the actuator's travel range.

6. The system as recited in claim 1, wherein the actuator is a rotary actuator and the diffraction grating includes a radial grating pattern.

7. The system as recited in claim 6, wherein the point of convergence of the radial grating lines is substantially coincident with the pivot point of the actuator.

8. The system as recited in claim 2, wherein the detection optics include reconstruction optics which compensate for variations in the angles of the diffracted laser beams caused by grating motion.

9. The system as recited in claim 2, wherein the detection optics include reconstruction optics which compensate for optical wavefront aberrations in the diffracted laser beams.

10. The system as recited in claim 1, wherein the fine decode electronics include a microprocessor.

11. The system as recited in claim 1, wherein the decoding electronics include means for generating quadrature signals;

means for measuring parameters of the quadrature signals; and means for computing from the measured parameters and the received first and second signals the actuator position.

12. The system as recited in claim 11, wherein the measured parameters include any of amplitude, DC offset bias, and phase difference.

13. The system as recited in claim 1, wherein the data recording disk drive is sealed by a housing enclosure, the laser is located externally to the disk drive, and the light beam enters and exits the disk drive through at least one aperture disposed in the housing enclosure.

14. The system as recited in claim 13, wherein the at least one aperture is covered with light-transmissive material.

15. The system as recited in claim 1, wherein the laser is attached to the data recording disk drive.

16. The system as recited in claim 1, wherein the light beam is collimated.

17. The system of claim 1, wherein the first and second signals are cyclic signals having a phase difference between them.

18. The system of claim 17, wherein the coarse decode electronics includes a counter which counts the cycles of the first and second signals to obtain the coarse position information.

19. The system of claim 17, wherein the fine decode electronics further resolve a single cycle of the first and second signals to obtain the fine position information.

20. The system of claim 1, wherein the first and second signals are quadrature signals.

21. The system of claim 20, wherein the coarse decode electronics includes a quadrature counter which counts the cycles of the first and second signals to obtain the coarse position information.

22. The system of claim 20, wherein the fine decode electronics further resolve a single cycle of the quadrature signals into $2^N$ parts.

23. The system of claim 1, wherein the coarse position information further comprises magnitude of actuator movement and direction of actuator movement relative to an initial position.

24. The system of claim 1, wherein the fine position decode electronics obtains the fine position information by measuring a phase difference between the first and second signals.

25. The system of claim 1, wherein the fine position information includes information about absolute direction of movement of the actuator.

26. The system of claim 1, wherein the position signal is produced by splicing the coarse actuator position information with the fine actuator position information.

27. The system of claim 1, wherein the decode electronics comprise, a counter which counts cycles of the first and second signals to produce a coarse grating position, at least one memory addressed by the coarse grating position for storing first and second pluralities of amplitude adjustment values corresponding to selected grating positions, a circuit for adjusting the first signal using a value selected from the first amplitude adjustment values and corresponding to the current coarse grating position, and for adjusting the second signal using a value selected from the second amplitude adjustment values and corresponding to the current coarse grating position, and a processor for receiving the coarse grating position and the adjusted first and second signals and producing therefrom the actuator position signal.

28. The system of claim 27, wherein the first and second plurality of amplitude adjustment values comprise a plurality of average amplitudes obtained in a calibration procedure wherein the actuator is swept through its range of movement and an average amplitude for each of the selected grating positions is determined.

29. The system of claim 28, wherein the first and second signals are cyclical, and wherein $2^N$ average amplitudes are determined for each cycle of the first and second signals.

30. The system of claim 28, wherein the decode electronics further comprises a feedback loop for determining the plurality of average amplitudes during the calibration process.

31. The system of claim 30, wherein the feedback loop further comprises a bias detector, divider and accumulator.

32. A system for generating a reference clock in a data recording disk drive having a rotating spindle stack and at least one disk surface for storing data, comprising:

a laser of fixed position relative to the spindle stack which emits a light beam incident to the spindle stack;

a reflective diffraction grating, affixed to the spindle stack, which diffracts the incident light beam;

detection optics which detect phase differences in the diffraction pattern reflected from the grating; and clock detection electronics, coupled to the detection optics, which receive the detected phase differences and convert them into a reference clock signal phase-locked to the disk surface for use in controlling circumferential position during servowriting of the disk surface.

33. The system as recited in claim 32, wherein the clock detection electronics further convert the received phase differences into a signal representing an index location on the spindle stack.

34. The system as recited in claim 32, wherein the detection optics detects the phase difference between the +1 order diffracted laser beam and the −1 order diffracted laser beam.

35. The system as recited in claim 32, wherein the laser is a semiconductor laser.

36. The system as recited in claim 32, wherein the diffraction grating includes a radial grating pattern.

37. The system as recited in claim 32, wherein the detection optics include reconstruction optics which compensate for optical wavefront aberrations in the diffracted laser beams.

38. The system as recited in claim 32, wherein the light beam is substantially focused at the grating surface and the detection optics include reconstruction optics which re-collimate the diffracted laser beams.

39. The system as recited in claim 32, wherein. the detection electronics include raw clock detection electronics and timing adjustment electronics for measuring grating centration error and providing compensation therefor.

40. The system as recited in claim 32, further comprising:

a second laser, positioned on the opposite side of the diffraction grating center from the first laser, which emits a second light beam incident to the diffraction grating;

second detection optics which detect phase differences in the second diffraction pattern reflected from the grating;

second clock detection electronics, coupled to the second detection optics, which receive the second detected phase differences and convert them into a second reference clock signal; and mixer electronics, coupled to the first and second clock detection electronics, which combine the first and second reference clock signals to produce a reference clock signal compensated for grating centration error.

41. The system as recited in claim 32, wherein the data recording disk drive is enclosed by a housing, the laser is located externally to the disk drive, and the light beam enters and exits the disk drive through at least one aperture disposed in the housing.

42. The system as recited in claim 32, wherein the at least one aperture is covered with light-transmissive material.

43. The system as recited in claim 32, wherein the laser is attached to the data recording disk drive.

44. The system as recited in claim 32, wherein the light beam is collimated.

45. The system as recited in claim 32, wherein the light beam is substantially focused at the grating surface.

46. The system as recited in claim 32, wherein the reflective diffraction grating is in the shape of a full annulus substantially centered at the spindle stack rotation axis.

47. A system for writing servo information in an enclosed data recording disk drive having a housing enclosing a spindle stack which includes a data recording disk and a spindle motor having a spindle shaft for attachment to the center of the data recording disk, and a data recording head attached to an actuator positionable over the data recording disk, comprising:

a first semiconductor laser, located externally to the disk drive, which emits a light beam to the actuator, the light beam having a substantially constant angle of incidence with respect to the actuator;

a first reflective diffraction grating, affixed to the actuator, which diffracts the incident light beam from the first semiconductor laser;

a first detection optics which produce first and second signals from the diffracted beam indicative of direction and magnitude of actuator movement during servowriting; and actuator position signal decode electronics, coupled to the first detection optics, which receive the first and second signals and produce therefrom a position signal indicative of the actuator position during servowriting, the decode electronics including coarse decode electronics for obtaining coarse actuator position information, and fine decode electronics for further resolving the coarse actuator position information to obtain fine actuator position information, wherein the coarse and fine decode electronics process the first and second signals in determining the fine and coarse position information, the position signal being produced from both the coarse and fine actuator position information;

servo controller electronics, coupled to the actuator position decode electronics and the actuator, which controllably adjust the position of the actuator; and servo pattern generator, coupled to the data recording head, which provides servo information for the data recording head to write on the data recording disk.

48. The system as recited in claim 47, further comprising:

a second semiconductor laser, located externally to the disk drive, which emits a light beam incident to the spindle stack;

a second reflective diffraction grating, affixed to the spindle stack, which diffracts the incident light beam from the second semiconductor laser;

second detection optics which detect phase differences in the diffraction pattern reflected from the second grating;

clock detection electronics, coupled to the second detection optics, which receive the detected phase differences and convert them into a reference clock signal; and servo write control electronics, coupled to the servo controller electronics, the servo pattern generator, and the clock detection electronics, which coordinate the writing of the servo information.

49. The system as recited in claim 48, wherein the light beams and diffraction patterns enter and exit the enclosed data recording disk drive through apertures disposed in the housing enclosure, which apertures are covered with light-transmissive material.

50. The system as recited in claim 48, wherein the first and second semiconductor lasers are attached to the data recording disk drive.

51. The system as recited in claim 48, wherein at least one of the light beams is collimated.

52. The system as recited in claim 48, wherein the second reflective diffraction grating is in the shape of a full annulus substantially centered at the spindle stack rotation axis.

53. The system of claim 47, wherein the first and second signals are cyclic signals having a phase difference between them.

54. The system of claim 53, wherein the coarse decode electronics includes a counter which counts the cycles of the first and second signals to obtain the coarse position information.

55. The system of claim 53, wherein the fine decode electronics further resolve a single cycle of the first and second signals to obtain the fine position information.

56. The system of claim 47, wherein the first and second signals are quadrature signals.

57. The system of claim 56, wherein the coarse decode electronics includes a quadrature counter which counts the cycles of the first and second signals to obtain the coarse position information.

58. The system of claim 56, wherein the fine decode electronics further resolve a single cycle of the quadrature signals into $2^N$ parts.

59. The system of claim 47, wherein the coarse position information further comprises magnitude of actuator movement and direction of actuator movement relative to an initial position.

60. The system of claim 47, wherein the fine position decode electronics obtains the fine position information by measuring a phase difference between the first and second signals.

61. The system of claim 47, wherein the fine position information includes information about absolute direction of movement of the actuator.

62. The system of claim 47, wherein the position signal is produced by splicing the coarse actuator position information with the fine actuator position information.

63. The system of claim 47, wherein the decode electronics comprise,
    a counter which counts cycles of the first and second signals to produce a coarse grating position,
    at least one memory addressed by the coarse grating position for storing first and second pluralities of amplitude adjustment values corresponding to selected grating positions,
    a circuit for adjusting the first signal using a value selected from the first amplitude adjustment values and corresponding to the current coarse grating position, and for adjusting the second signal using a value selected from the second amplitude adjustment values and corresponding to the current coarse grating position,
    and a processor for receiving the coarse grating position and the adjusted first and second signals and producing therefrom the actuator position signal.

64. The system of claim 63, wherein the first and second plurality of amplitude adjustment values comprise a plurality of average amplitudes obtained in a calibration procedure wherein the actuator is swept through its range of movement and an average amplitude for each of the selected grating positions is determined.

65. The system of claim 64, wherein the first and second signals are cyclical, and wherein $2^N$ average amplitudes are determined for each cycle of the first and second signals.

66. The system of claim 64, wherein the decode electronics further comprises a feedback loop for determining the plurality of average amplitudes during the calibration process.

67. The system of claim 66, wherein the feedback loop further comprises a bias detector, divider and accumulator.

68. A system for writing servo information in an enclosed data recording disk drive having a housing enclosing a spindle stack which includes at least one disk surface for storing data and a spindle motor having a spindle shaft for attachment to the center of the data recording disk, and a data recording head attached to an actuator positionable over the data recording disk, comprising:
    an actuator position subsystem comprising,
        a first semiconductor laser, located externally to the disk drive, which emits a light beam to the actuator, the light beam having a substantially constant angle of incidence with respect to the actuator;
        a first reflective diffraction grating, affixed to the actuator, which diffracts the incident light beam from the first semiconductor laser;
        first detection optics which produce first and second signals from the diffracted beam indicative of direction and magnitude of actuator movement during servowriting; and
        actuator position signal decode electronics, coupled to the first detection optics, which receive the first and second signals and produce therefrom a position signal indicative of the actuator position during servowriting, the decode electronics including coarse decode electronics for obtaining coarse actuator position information, and fine decode electronics for further resolving the coarse actuator position information to obtain fine actuator position information, wherein the coarse and fine decode electronics process the first and second signals in determining the fine and coarse position information, the position signal being produced from both the coarse and fine actuator position information;
    a write clock subsystem for generating a reference clock comprising,
        a laser of fixed position relative to the spindle stack which emits a light beam incident to the spindle stack,
        a reflective diffraction grating, affixed to the spindle stack, which diffracts the incident light beam,
        detection optics which detect phase differences in the diffraction pattern reflected from the grating,
        clock detection electronics, coupled to the detection optics, which receive the detected phase differences and convert them into a reference clock signal phase-locked to the disk surface for use in controlling circumferential position during servowriting of the disk surface;
    servo controller electronics, coupled to the actuator position decode electronics and the actuator, which controllably adjust the position of the actuator; and
    servo pattern generator, coupled to the data recording head, which provides servo information for the data recording head to write on the data recording disk.

* * * * *

UNITED STATES PATENT AND TRADEMARK OFFICE
CERTIFICATE OF CORRECTION

PATENT NO. : 5,909,333

DATED : June 1, 1999

INVENTOR(S) : Best et al

It is certified that error appears in the above-identified patent and that said Letters Patent is hereby corrected as shown below:

On the Title Page, and in column 1, the title should read as follows:

Item [54] "SERVO-WRITING SYSTEM FOR USE IN A DATA RECORDING DISK DRIVES" should read --NON-INTRUSIVE SERVO-WRITING SYSTEM FOR DATA RECORDING DISK DRIVES--

Col. 1, line 5, delete "1984" and insert 1994

Col. 2, line 36, delete "in" and insert is

Col. 9, line 12, delte "A" and insert $\lambda$

Col. 9, line 22, delete "+" and insert $\pm$

Col. 9, line 51, delete "beamt" and insert beam

Col. 14, line 18, delete "fme" and insert fine

Col. 16, line 56, delete "comer" and insert corner

Col. 17, line 19, delete "'1" and insert -1

Col. 17, line 66, delete "misalignment" and insert mis-alignment

Col. 19, line 43, delete "fimction" and insert function

Col. 19, line 64, delete "16" and insert 16

UNITED STATES PATENT AND TRADEMARK OFFICE
CERTIFICATE OF CORRECTION

PATENT NO. : 5,909,333

DATED : June 1, 1999

INVENTOR(S) : Best et al

It is certified that error appears in the above-identified patent and that said Letters Patent is hereby corrected as shown below:

Col. 19, line 66, delete "M-DAC's" and insert M-DAC

Col. 21, line 17, delete "cos $(f_1)$xcos $(f_2)$=0.5[cos $(f_1)$+$(f_2)$+cos $(f_1f_2)$]" and insert cos $(f_1)$ x cos $(f_2)$ = 0.5[cos $(f_1 + f_2)$ + cos $(f_1 - f_2)$]

Col. 24, line 8, delete "leans" and insert lens

Col. 24, line 49, delete the space between "1206" and "."

Col. 26, line 31 delete "γΔ√3 $f_2$|/|$f_1$|=$h_2$/$h_1$=$d_2$/$d_1$," and insert γΔ|$f_2$|/|$f_1$| = $h_2$/$h_1$ = $d_2$/$d_1$ Col. 27, line 13, delete "decode" and insert decoding Signed and Sealed this Tenth Day of April, 2001

Attest:

NICHOLAS P. GODICI

Attesting Officer    Acting Director of the United States Patent and Trademark Office